US012458858B2

(12) United States Patent
Anton et al.

(10) Patent No.: US 12,458,858 B2
(45) Date of Patent: Nov. 4, 2025

(54) INTERACTIVE SOCCER SYSTEM

(71) Applicant: Huupe Inc., New York, NY (US)

(72) Inventors: Paul Anton, New York, NY (US); Lyth Saeed, Irvine, CA (US); Dan Hayes, Milwaukee, WI (US); Adam Jaber, Melbourne Beach, FL (US); Matt McConaha, Charlotte, NC (US)

(73) Assignee: Huupe Inc., Irvine, CA (US)

( * ) Notice: Subject to any disclaimer, the term of this patent is extended or adjusted under 35 U.S.C. 154(b) by 240 days.

(21) Appl. No.: 17/987,561

(22) Filed: Nov. 15, 2022

(65) Prior Publication Data

US 2023/0191221 A1 Jun. 22, 2023

Related U.S. Application Data

(60) Provisional application No. 63/290,914, filed on Dec. 17, 2021.

(51) Int. Cl.
*A63B 69/00* (2006.01)
*A63B 24/00* (2006.01)
(Continued)

(52) U.S. Cl.
CPC ........ *A63B 69/002* (2013.01); *A63B 24/0006* (2013.01); *A63B 24/0021* (2013.01);
(Continued)

(58) Field of Classification Search
CPC .............. A63B 69/002; A63B 24/0006; A63B 24/0021; A63B 24/0062; A63B 71/0622;
(Continued)

(56) References Cited

U.S. PATENT DOCUMENTS

| 4,397,464 A | 8/1983 | Krug |
| 4,424,968 A | 1/1984 | Smith |

(Continued)

FOREIGN PATENT DOCUMENTS

| CN | 107812368 | 3/2018 |
| WO | WO 2018/039341 | 3/2018 |
| WO | WO 2018/158773 | 9/2018 |

OTHER PUBLICATIONS

U.S. Appl. No. 17/987,641, Anton et al., filed Nov. 15, 2022.
International Search Report and Written Opinion in International Appln. No. PCT/US2021/046468, mailed Nov. 30, 2021, 17 pages.

*Primary Examiner* — Nini F Legesse
(74) *Attorney, Agent, or Firm* — Fish & Richardson P.C.

(57) ABSTRACT

Methods, systems, and apparatus, including computer programs encoded on computer storage media, for a soccer system. The soccer system includes a display screen, a plurality of sensors configured to generate sensor data regarding a shot attempt of a user, imaging devices configured to generate image data of the shot attempt, a speaker, and a control unit. The control unit can receive (i) the sensor data from the plurality of sensors and (ii) the image data from the imaging devices. Based on the received sensor data, the control unit can determine whether the shot attempt was successful. Based on the received image data and whether the shot attempt was successful, the control unit can generate analytics that indicate characteristics of the user and the shot attempt and recommendations for improving the shot attempt for subsequent shot attempts. The control unit can provide output data representing the analytics.

20 Claims, 9 Drawing Sheets

(51) Int. Cl.
*A63B 71/06* (2006.01)
*G01S 17/88* (2006.01)

(52) U.S. Cl.
CPC ...... *A63B 24/0062* (2013.01); *A63B 71/0622* (2013.01); *G01S 17/88* (2013.01); *A63B 2024/0034* (2013.01); *A63B 2024/0056* (2013.01); *A63B 2071/0625* (2013.01); *A63B 2071/0666* (2013.01); *A63B 2208/02* (2013.01); *A63B 2220/05* (2013.01); *A63B 2220/40* (2013.01); *A63B 2220/803* (2013.01); *A63B 2220/806* (2013.01); *A63B 2243/0025* (2013.01)

(58) Field of Classification Search
CPC .... A63B 2024/0034; A63B 2024/0056; A63B 2071/0625; A63B 2071/0666; A63B 2208/02; A63B 2220/05; A63B 2220/40; A63B 2220/803; A63B 2220/806; A63B 2243/0025; A63B 2024/0028; A63B 2220/30; A63B 2220/805; A63B 2220/833; A63B 2220/89; A63B 2225/50; G01S 17/88
USPC ........ 473/409, 416, 446–448, 450, 478, 483
See application file for complete search history.

(56) References Cited

U.S. PATENT DOCUMENTS

| | | | |
|---|---|---|---|
| 6,984,129 | B1 | 1/2006 | Jordan |
| 7,094,164 | B2 | 8/2006 | Marty et al. |
| 7,850,552 | B2* | 12/2010 | Marty ................ A63B 69/0071 473/448 |
| 8,579,632 | B2 | 11/2013 | Crowley |
| 8,597,095 | B2 | 12/2013 | Crowley et al. |
| 8,617,008 | B2* | 12/2013 | Marty ....................... G06T 7/70 473/422 |
| 9,186,568 | B2 | 11/2015 | Ianni et al. |
| 9,275,470 | B1 | 3/2016 | Forkosh et al. |
| 9,345,929 | B2 | 5/2016 | Marty et al. |
| 10,360,685 | B2 | 7/2019 | Marty et al. |
| 11,045,705 | B2 | 6/2021 | Zhang |
| 11,484,760 | B2 | 11/2022 | Anton et al. |
| 2002/0165049 | A1 | 11/2002 | Dadbeh |
| 2003/0176124 | A1* | 9/2003 | Koike ..................... B32B 27/08 442/16 |
| 2008/0129825 | A1* | 6/2008 | DeAngelis ........... H04N 23/661 348/E7.086 |
| 2014/0156042 | A1* | 6/2014 | Marty ................ A63B 24/0021 700/91 |
| 2014/0222177 | A1 | 8/2014 | Thurman et al. |
| 2016/0016059 | A1* | 1/2016 | Martinez ............... A63B 63/004 473/478 |
| 2016/0121193 | A1 | 5/2016 | Marty et al. |
| 2016/0193518 | A1* | 7/2016 | Baxter ............... A63B 21/0442 473/483 |
| 2017/0021228 | A1 | 1/2017 | Crowley |
| 2018/0093160 | A1* | 4/2018 | Alhadeff ............... A63B 71/023 |
| 2018/0189971 | A1* | 7/2018 | Hildreth .................... G06T 7/13 |
| 2018/0318715 | A1* | 11/2018 | Dawe .................... A63F 13/573 |
| 2019/0366153 | A1 | 12/2019 | Zhang et al. |
| 2019/0392729 | A1 | 12/2019 | Lee et al. |
| 2020/0009443 | A1 | 1/2020 | Moravchik et al. |
| 2020/0258419 | A1 | 8/2020 | Lee et al. |
| 2021/0146220 | A1* | 5/2021 | Hall ..................... A63B 63/004 |
| 2021/0174700 | A1 | 6/2021 | Zhang et al. |
| 2022/0212077 | A1 | 7/2022 | Anton et al. |

\* cited by examiner

600

```
┌─────────────────────────────────────────────────────────────────────┐
│ Receiving sensor data from a plurality of sensors and image data    │
│ from one or more imaging devices regarding a shot attempt of a      │
│ user, the plurality of sensors and the one or more imaging          │
│ devices coupled to a soccer system                                  │
│                                                                 602 │
└─────────────────────────────────────────────────────────────────────┘
```

```
┌─────────────────────────────────────────────────────────────────────┐
│ Based on the received sensor data, determining whether the shot     │
│ attempt was successful                                              │
│                                                                 604 │
└─────────────────────────────────────────────────────────────────────┘
```

```
┌─────────────────────────────────────────────────────────────────────┐
│ Based on the received image data and whether the shot attempt was   │
│ successful, generating analytics that indicate (i) characteristics  │
│ of the user, (ii) characteristics of the shot attempt, (iii)        │
│ recommendations for improving the shot attempt for subsequent shot  │
│ attempts, and (iv) game performance                                 │
│                                                                 606 │
└─────────────────────────────────────────────────────────────────────┘
```

```
┌─────────────────────────────────────────────────────────────────────┐
│ Providing output data representing the analytics to one or more of  │
│ (i) the speaker, (ii) the display screen, and (iii) a client device │
│ of the user                                                         │
│                                                                 608 │
└─────────────────────────────────────────────────────────────────────┘
```

FIG. 6

INTERACTIVE SOCCER SYSTEM

CROSS-REFERENCE TO RELATED APPLICATION

This application claims the benefit of U.S. Provisional Application No. 63/290,914, titled "Interactive Soccer System" and filed on Dec. 17, 2021, which is incorporated herein by reference.

TECHNICAL FIELD

The specification generally relates to the sport of soccer, and one particular implementation relates to systems and methods for soccer games and various trainings.

BACKGROUND

The game of soccer is a sport that can include two teams, opposing one another on a soccer field. The two teams can compete against one another with an objective of shooting a soccer ball through a defender's goal while preventing the opposing team from shooting through their own goal. Players with varying skill level can play soccer, and often, practice soccer skills to improve their chances of success during a game of soccer against opponents. Moreover, players may hire coaches, trainers, or others to assist with training their soccer skillset over time.

SUMMARY

This specification describes a soccer system that includes specific components for monitoring a user playing soccer. In particular, the soccer system can include a display system and various configurations of the display system associated with a soccer goal. The display system can include multiple layers, each layer housing different components. The components can be positioned in particular manners and varying layouts in the display system to enable the components to monitor one or more characteristics of one or more users interacting with the soccer system on a field within proximity to the soccer system.

In some implementations, the soccer system can be placed at a soccer field. The soccer field can include, for example, a field of grass, a street, a driveway, and an indoor soccer field that can include professional, collegiate level, or younger dimensions, and other various locations. The soccer field can include, for example, two halves divided by a half-way line, a center line, a center circle, a penalty area, and other characteristics. The soccer system can monitor characteristics of users that play soccer up to the half-way line or to a full length of the soccer field. In other examples, the soccer system can monitor characteristics of users that play soccer when playing in certain locations such as the soccer field, a driveway, a basement of their home, or other various locations.

The soccer system can monitor characteristics of one user playing soccer or multiple users playing soccer. In particular, a user can interact with the soccer system to indicate that he/she requests to be tracked by the soccer system. The user can play soccer with the soccer system and the soccer system can generate characteristics that describe the user's play. For example, the characteristics can include a number of shots attempted by the user to the soccer goal, a number of shots made by the user from the attempts, e.g., shots that entered the soccer goal, movements of the user, body posture during shot attempts, characteristics of each shot attempt by the user, and other characteristics. The soccer system can provide these characteristics to a client device of the user for later viewing or display these characteristics on the soccer system in real time while the user interacts with the soccer system.

In some implementations, the display system of the soccer system can include the components for tracking one or more users playing soccer with the soccer system and the ability to provide feedback to the users. For example, the display system of the soccer system can include multiple layers each housing different components. A front layer of the display system can include a transparent coating for protection of the components within the display system. A second layer of the display system can include one or more components for monitoring the users interacting with the soccer system. In some implementations, the second layer can also include a display for providing feedback to the user playing soccer along with the sensors. In other implementations, the display can be positioned in a third layer and the components can be provided in the second layer. In some examples, the layers of the display system can be ordered from front to back as: first layer, second layer, and/or third layer.

In some implementations, the components in the display system can be configured to monitor the users playing soccer and provide them feedback. For example, the components can include a camera sensing system, one or more speakers, one or more microphones, multiple sensors, a control unit, a display screen, and a power unit. The control unit can receive the data from each of these components, generate characteristics of the user(s), and provide feedback to the user(s) to help improve their soccer skillset or performance. In some examples, the control unit can train a machine-learning model for tracking and generating the characteristics of the user(s) playing soccer. The machine-learning model can be, for example, a convolutional neural network (CNN). These components and their functions will be further described in detail below.

In some implementations, the soccer system can offer various games for the user(s) to play. For example, the soccer system enables the user to play against another user locally or other users at a geographically different location. In this example, the other user can play soccer with their own soccer system, and the two soccer systems can communicate with one another in real time as the two users play with their respective soccer systems. For example, both display systems can display soccer shot statistics, a real-time video feed of the other user's soccer gameplay, and other information that each user can view while interacting with the soccer system. In another example, the soccer system can enable users to play games such as, training sessions modes, local head-to-head matchups, live stream mode, and worldwide competition mode. These gameplays will be further described below.

In one general aspect, a soccer system comprising: a display screen; a plurality of sensors configured to generate sensor data regarding a shot attempt of a user; one or more imaging devices configured to generate image data of the shot attempt; a speaker; and a control unit, wherein the control unit is configured to: receive (i) the sensor data from one or more of the plurality of sensors and (ii) the image data from the one or more imaging devices; based on the received sensor data, determine whether the shot attempt was successful; based on the received image data and whether the shot attempt was successful, generate analytics that indicate (i) characteristics of the user, (ii) characteristics of the shot attempt, (iii) recommendations for improving the shot attempt for subsequent shot attempts, and (iv) game performance; and provide output data representing the analytics to one or more of (i) the speaker, (ii) the display screen, and (iii) a client device of the user.

Other embodiments of these and other aspects of the disclosure include corresponding systems, apparatus, and computer programs, configured to perform the actions of the methods, encoded on computer storage devices. A system of one or more computers can be so configured by virtue of software, firmware, hardware, or a combination of them installed on the system that in operation causes the system to perform the actions. One or more computer programs can be so configured by virtue of having instructions that, when executed by a data processing apparatus, cause the apparatus to perform the actions.

The foregoing and other embodiments can each optionally include one or more of the following features, alone or in combination. For example, one embodiment includes all the following features in combination.

In some implementations, the soccer system includes wherein the plurality of sensors comprise one or more of LIDAR sensors, motion sensors, trip sensors, and accelerometers, and wherein the LIDAR sensors are configured to generate sensor data indicative of the shot attempt of the user and one or more of an angle, a height and a path of a soccer ball from the shot attempt; the motion sensors are configured to generate sensor data indicative of one or more users on a field within proximity to a soccer goal; the trip sensors are configured to generate sensor data indicative of whether the shot attempt was successful; the accelerometers are configured to generate sensor data indicative of an indication of a location of the soccer ball relative to the soccer goal based on accelerometer data and a vibration pattern; and wherein the control unit is configured to (i) detect the shot attempt of the user and one or more of the angle, the height and the path of the soccer ball from the shot attempt using the sensor data from the LIDAR sensors; (ii) detect the one or more users on the field within the proximity to the soccer goal using the sensor data from the motion sensors; (iii) determine whether the shot attempt was successful using the sensor data from the trip sensors; and (iv) determine the location of the soccer ball relative to the soccer goal based on accelerometer data and the vibration pattern using the sensor data from the accelerometers.

In some implementations, the soccer system includes wherein the one or more imaging devices comprise one or more depth sensing cameras or one or more RGB cameras, wherein the one or more depth sensing cameras are configured to perform one or more of the following (i) detect the user on a field, (ii) track movements of the user, (iii) detect the soccer used by the user for the shot attempt, (iv) track movements of the soccer ball, (v) detect a body posture of a user, and (vi) record a field of view for a soccer field given that one or more of the RGB cameras are configured to record video images.

In some implementations, the soccer system further includes a soccer goal.

In some implementations, the soccer system includes wherein the plurality of sensors comprise trip sensors configured to generate sensor data indicative of whether a soccer ball passes through a plane of the soccer goal from the shot attempt; and wherein the control unit is configured to determine whether the soccer ball passes through the plane of the soccer goal from the shot attempt using the sensor data from the trip sensors.

In some implementations, the soccer system includes wherein the plurality of sensors comprise a two dimensional LIDAR sensor configured to generate sensor data indicative of whether a soccer ball passes through a plane of the soccer goal from the shot attempt.

In some implementations, the soccer system includes wherein the speaker is configured to provide audible output in response to receiving the output data representing the analytics from the control unit.

In some implementations, the soccer system includes wherein the display screen is configured to display one or more of (i) the image data from the one or more imaging devices, (ii) a heads up display (HUD) displaying shot attempts and shots made by the user or any other data pertinent to the user and/or the game/training session, (iii) image data from a second control unit connected over a network, and (iv) image data from a client device.

In some implementations, the soccer system further includes a protective layer coupled to the display screen.

In some implementations, the soccer system includes wherein the protective layer comprises tempered glass.

In some implementations, the backboard includes a soccer goal coupled to the protective layer.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

FIG. 6 is a flow diagram that illustrates an example of a process for generating characteristics of a user playing soccer.

Like reference numbers and designations in the various drawings indicate like elements.

DETAILED DESCRIPTION

Figure 1A:
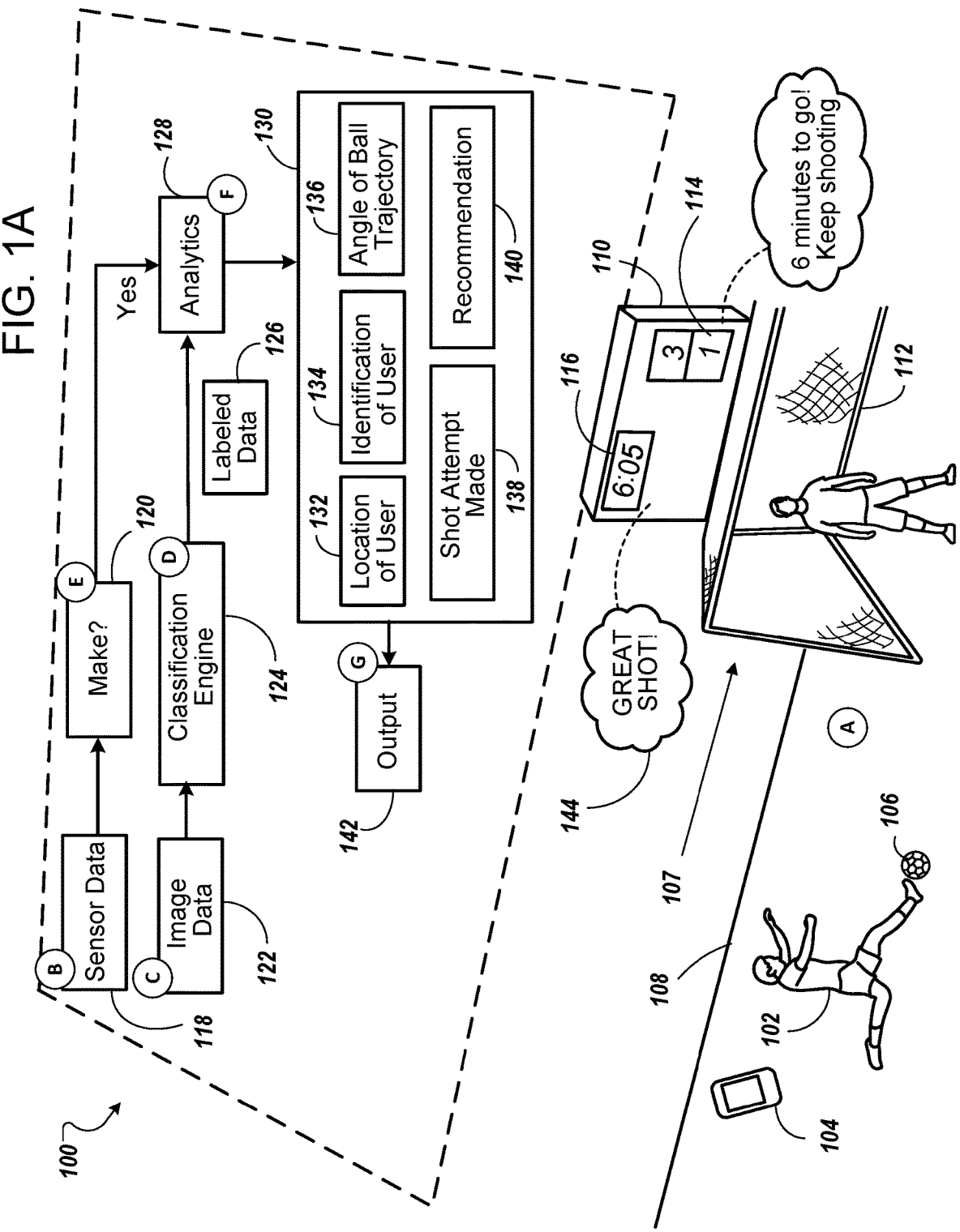
FIG. 1A is a block diagram that illustrates an example of a system for monitoring a user playing soccer.

FIG. 1A is a block diagram that illustrates an example of a system 100 for monitoring a user or users interacting with the system 100 through an activity, such as a user or users playing soccer. The system 100 includes a soccer system 107, a soccer field 108, one or more users 102, and a client device 104 associated with the one or more users 102. The system 100 can also include a network and server external to the soccer system 107. Briefly, the system 100 can monitor the one or more users 102 playing with a soccer ball 106 and the soccer system 107, generate data that describes the characteristics of the one or more users 102 playing with the soccer ball 106, and provide data as feedback to the one or more users 102. The system 100 can provide the data as feedback to the client device 104 or to a display of the soccer system 107. FIG. 1A illustrates various operations in exemplary stages (A) through (G) which can be performed in the sequence indicated or another sequence.

In some implementations, the soccer system 107 can include a soccer goal 112 and a display system 110. The soccer system 107 can include various components and algorithms that enable tracking and monitoring of the one or more users 102 playing the game of soccer. Additionally, the various components of the soccer system 107 can generate recommendations to improve a soccer skillset of the user 102. The recommendations can focus on improving, for example, the trajectory of a soccer shot, e.g., kick or header, for a user, a user's body posture during a soccer shot, soccer dribbling techniques of the user, and other soccer techniques. As will be further described below, the soccer system 107 can track multiple users 102, track the users' soccer characteristics, and store this data in a user profile located in a server external to the soccer system 107.

Moreover, the soccer system 107 enables the one or more users 102 to play soccer games with each other at the same soccer system and with other users located remote from their own respective soccer systems, including other soccer systems located at locations around the world. In some implementations, the user 102 can request to play soccer games or other activities, such as soccer training sessions, by interacting with the soccer system 107. In other implementations, the user 102 can request to play soccer games with the soccer system 107 by interacting with the client device 104 that communicates with the soccer system 107 over a network, such as one or more of Bluetooth, Wi-Fi, Internet, cloud access, and a cellular data network, e.g., a network with 4G and 5G capabilities. As will be further described below, the soccer games or other activities can include, for example, a training session mode, a head-to-head matchup mode, a worldwide competition mode, and a live stream mode, to name a few.

In some implementations, the soccer system 107 can include a soccer goal 112 and a display system 110. The display system 110 may be attached to a top portion of the soccer goal 112. In other examples, the display system 110 can be embedded within a side bar or side portion of the soccer goal 112. The soccer system 227 can be placed on varying playing surfaces, e.g., a driveway, a street, a lawn, a soccer field, or another applicable soccer playing surface. The soccer system 107 can be embedded in the ground. In some examples, the display system 110 may be positioned in a separate location from the soccer goal 112. In some cases, the soccer system 107 can be a small sized soccer system that can fit within a bedroom, an office, or other places, for example.

In some implementations, the display system 110 can include multiple layers, each layer housing different components. In particular, a front layer of the display system 110 can include a transparent coating for protection of the components within the display system. For example, a front layer of the display system 110 can include tempered glass that (i) protects the components within the display system 110 and (ii) allows a user to see a display screen behind the front layer. The display system 110 can include a second layer, which is seated or positioned behind the front layer. The second layer can include one or more components, e.g., sensors and cameras, for monitoring and generating data, e.g., sensor data and image data, associated with user(s) on the field. In some implementations, the second layer of the display system can also include a display for providing feedback to the one or more users playing soccer on the soccer field 108. In this case, the sensors and cameras can be coupled to the display screen. In other implementations, the display system can include a third layer that is positioned behind the second layer. In this implementation, the third layer can include the display that provides feedback to the one or more users playing soccer on the soccer field 108.

In some implementations, the soccer system 107 can include a control unit. The control unit can include one or more central processing units (CPUs), one or more graphical processing units (GPUs), and memory components for executing software by the CPUs and GPUs. In some examples, the control unit can be positioned on a rear side of the display system 110. In other examples, the control unit can be positioned within either the second layer or the third layer of the display system 110.

Generally, the control unit can receive the sensor and image data from the one or more components within the display system. Based on the received sensor and image data, the control unit can generate data regarding soccer characteristics of the user or users 102 playing soccer with the soccer system 107 on the soccer field 108. The control unit can identify a user profile associated with the user 102, for example, and store the generated soccer characteristics of the user in the profile for that user. The control unit can store the user profile and associated data within the display system 110. Alternatively, the control unit can access a server external to the display system 110 over a network and store the generated soccer characteristics within an identified user profile in the server. The network can include, for example, one or more of Bluetooth, Wi-Fi, Internet, cloud access, and a cellular data network, e.g., 4G and 5G capabilities.

In some implementations, the control unit can generate recommendations for a particular user based on the data regarding soccer characteristics of the user. The control unit can display the generated recommendations to the display screen of the display system. Additionally, the control unit can provide the generated recommendations to the client device 104 of the user 102. The control unit can also store the generated recommendations with the generated profile of an identified user, e.g., with the profile of user 102.

In some implementations, the soccer system 107 can include a power source that powers the one or more components coupled to the display system 110. For example, the power source can power the one or more components within the second layer of the display system 110, the display within the display system 110, and the control unit. The power source can include, for example, a power plug that is inserted into an outlet, a solar energy panel coupled to the soccer system 107, or a rechargeable battery pack attached or coupled to the soccer system 107.

In some implementations, the display system 110 can include one or more components that monitor the user(s) 102 playing with the soccer 106 on the soccer field 108. In particular, the one or more components can include multiple sensors and multiple cameras positioned within the display system 110. The multiple sensors can include, for example, one or more vibration sensors, one or more trip sensors, one or more accelerometers, light detection and ranging (LIDAR) sensors, one or more motion sensors, and one or more pressure sensors. The multiple cameras can include depth sensing cameras, such as stereo-depth cameras, and red green blue (RGB) cameras. The control data can receive the data from each of the multiple sensors and from each of the multiple cameras to generate characteristics about the user 102 playing soccer.

Each of the sensors included within the display system 110 can be configured for a different purpose. For example, the vibration sensors can be configured to detect a vibration of the soccer system 107 from the soccer ball 106 (i) bouncing off a bar of the soccer goal 112 and (ii) passing through the soccer goal 112 and striking a net of the soccer goal 112, and (iii) a user 102 dribbling the soccer ball 106 on the soccer field 108. A LIDAR sensor can be configured to determine whether user 102's shot attempt was successful. A successful shot attempt can indicate that the soccer ball 106 passed through the soccer goal 112 and struck a net of the soccer goal 112. An unsuccessful shot attempt can indicate that the soccer ball 106 did not pass through the soccer goal 112, e.g., bounced off a bar of the soccer goal 112 or missed the soccer goal 112 completely. This will be further illustrated and described below.

The accelerometers can be configured to determine a location of the soccer ball relative to the soccer goal 112 based on accelerometer data and a vibration pattern. For example, when user 102 shoots the soccer ball 106 towards the soccer system 107 in an unsuccessful shot attempt, the soccer ball 106 may bounce off a bar of the soccer goal 112 at a particular location. The location can be, for example, a sidebar of the soccer goal 112 or a top bar of soccer goal 112. Based on where the soccer ball 106 bounces off the bar of the soccer goal 112, the soccer system 107 can exhibit a specific vibration pattern. The specific vibration pattern can correspond to a speed or frequency at which a component of the soccer system 107, e.g., the soccer goal vibrates. The accelerometers can be configured to measure the speed or frequency of the vibration pattern and provide the detected vibration pattern to the control unit.

In some implementations, when user 102 shoots or kicks the soccer ball 106 in a successful attempt towards the soccer goal 112, and the ball strikes a portion of the net, the accelerometers can detect a specific vibration pattern of the net to determine a location of the soccer ball 106's strike. The location can be determined based on a specific vibration pattern of the soccer system 107, the soccer goal 112, and/or a net of the soccer goal 112 in response to the soccer ball 106 striking the net.

In some examples, the accelerometer can determine the location that the soccer ball 106 bounced off a portion of the soccer system 107 based on the determined vibration pattern. The accelerometer can compare the determined vibration pattern to one or more stored vibration patterns. Each stored vibration pattern can indicate a location of where the soccer ball 106 hit on the soccer system 107. In this case, the accelerometer can provide the vibration pattern and the location of where the soccer ball 106 bounced off the soccer system 107, e.g., either a bar or a net of the soccer goal 112, in either a successful or an unsuccessful shot attempt, to the control unit. In other examples, the control unit can use the accelerometer data in conjunction with a signal-processing algorithm to determine the specific vibration pattern inherent in the different strike locations against the soccer system 107. For example, the control unit can sample the accelerometer data, run the sampled data through one or more matched filters to seek to identify the vibration pattern, and identify the vibration pattern that most closely matches to the matched filter. In other examples, the control unit can apply other signal-processing algorithms such as low-pass filters, high-pass filters, acoustic modeling, waveform matching, Fast Fourier transforms, Acceleration signal matching, and matching between signals based on statistical properties.

In some implementations, the LIDAR sensors can be configured to detect a shot attempt of user 102 and to detect characteristics of the shot attempt of the soccer ball 106 from the user 102. For example, the LIDAR sensors can indicate that a detection of the shot attempt based on a user 102's kick of soccer ball 106 and the body posture of user 102 during the shot or kick attempt. LIDAR sensors can produce thousands of points per second at a resolution of millimeters for an object within its range, when the range may be 15 meters, for example. The LIDAR sensors can detect when the soccer ball 106 is kicked by the user 102's foot or headed by the user 102's head during a shot attempt. Additionally, the LIDAR sensors can detect the characteristics of the shot attempt of the soccer ball 106 that can include an angle and height of the soccer ball 106 during the shot attempt. The LIDAR sensors can indicate an angle of the soccer ball 106 relative to a top portion of the soccer goal 112 during time increments of the shot attempt of the soccer ball 106's trajectory. Additionally, the LIDAR sensor can indicate a height of the soccer ball 106 relative to the soccer field 108 during time increments of the shot attempt of the soccer ball 106's trajectory. For example, the LIDAR sensor can indicate that the angle of the soccer ball 106 is 45 degrees at time $t_0$, 30 degrees at time $t_1$, 22.5 degrees at $t_2$, until the soccer ball 106 passes through a plane of the soccer goal 112 at 20 degrees at time $t_N$. The LIDAR sensors can provide this data to the control unit as the user 102 plays soccer. In some examples, the LIDAR sensor can measure and provide the angle of the soccer shot by measuring an angle between the soccer field and the tangent of the initial arc of the soccer shot at $t_0$. Generally, the LIDAR sensors can measure any angle of the shot attempt taken by user 102.

In some implementations, the motion sensors can be configured to detect one or more users 102 on the soccer field 108 within a proximity to the display system 110. For example, the motion sensors can detect movement on the soccer field 108 and can detect movement of a soccer ball 106. Based on the detection of movement, in some examples, the motion sensors can indicate whether the movement corresponds to a user 102 movement or to a soccer ball 106 movement. In other examples, the motion sensors can provide detection of the motion data to the control unit. As will be further described below, the control unit can collate the motion data, other sensor data, and the image data to determine whether the movement corresponds to a user 102 or a soccer ball 106.

In some implementations, the pressure sensors can be configured to detect and calculate the position of where the soccer ball 106 hits a bar or net of the soccer system 107. Based on a location where the soccer ball 106 hit the soccer system 107, the control unit can calculate the soccer ball 106's trajectory from the user 102's shot attempt. The location where the soccer ball 106 hit the soccer system 107 can be provided in locational coordinates, e.g., Cartesian or polar coordinates, either indicative of hitting a net of the soccer goal 112, a bar of the soccer goal 112, or a portion of the display system 110. In other examples, the control unit can determine the location where the soccer ball 106 hit the soccer system 107 based on image data and sensor data from other sensors without using the pressure sensor. For example, the control unit can predict the location where on the soccer system 107 the soccer ball 106 will hit based on initial conditions indicating how and where the soccer ball 106 was kicked by the user 102, known constants of gravity, air drag, parabolic mathematical equations, and other characteristics. Data provided from the LIDAR sensors can be helpful in making this location determination.

As mentioned above, the multiple cameras can include depth sensing cameras and RGB cameras. The multiple cameras or imaging devices can each be configured to perform different functions. For example, the display system 110 can include one to three depth-sensing cameras. Other examples are also possible. For example, the display system 110 can include more than three depth-sensing cameras, such as eight depth-sensing cameras, or more. The depth sensing cameras can be configured to (i) detect the user 102 on the soccer field 108, (ii) track movements of the user 102, (iii) detect the soccer ball 106 kicked or headed by the user 102 for the shot attempt, (iv) track movements of the soccer ball 106, and (v) detect a body posture of user 102. For example, the three depth sensing cameras can have overlapping fields of view (FOV) to include the widest view of the soccer field 108.

For example, the depth sensing cameras located in the display system 110 can be configured to detect the user 102 on the soccer field 108 based on software that detects movement of user 102 and identification of the user 102. The depth sensing cameras can detect and identify the user 102 without using machine-learning models, e.g., convolutional neural networks (CNNs), which provides advantages over prior systems. Moreover, the depth sensing cameras can track the movement of the user 102 as the user moves along the soccer field 108. The user can move, for example, to a location behind the penalty box to attempt a shot, to a location within the penalty box to attempt a shot, or to any other location on the soccer field 108.

The depth sensing cameras can track the user 102 by generating locational coordinates of the user 102 along the soccer field 108, and providing the locational coordinates of the user 102 within the image data to the control unit. Similarly, the depth sensing cameras can track the soccer ball 106 or multiple soccer balls by generating locational coordinates of the soccer ball 106 along the soccer field 108, and providing the locational coordinates of the soccer ball 106 within the image data to the control unit. For example, within each frame of image data recorded by the depth sensing cameras, the depth sensing cameras can draw a box around the identified user 102 and the soccer ball 106 and attach locational coordinates to each box, respectively. In this manner, the control unit can determine from each frame of the image data the location of user 102 and the soccer ball 106 as they move. Moreover, the depth sensing cameras can track multiple soccer balls and multiple users on the soccer field 108. The depth sensing cameras can also track and associate shot attempts and shot makes/misses for each user of the multiple users.

The depth sensing cameras can also track a body posture of user 102. The body posture of user 102 can correspond to a posture of the user during dribbling a soccer ball 106, during a shot attempt of the soccer ball 106, after a shot attempt of the soccer ball 106, and moving to catch the soccer ball 106 should the user 102's shot attempt be unsuccessful, e.g., such as bouncing off a bar of the soccer goal 112, to name a few examples. The body posture detected by the depth sensing cameras can indicate a position of the body, in locational coordinates. The depth sensing cameras can provide the body posture detection to the control unit, where further analytics can be performed on the body posture detection data.

In some implementations, the display system 110 can utilize the LIDAR sensors instead of the depth sensing cameras. In addition to the functionality described above with respect to the LIDAR sensors, the LIDAR sensors can also be configured to perform the functionality described by the depth sensing cameras. This functionality can include detecting identification and movement of a user or users on the soccer field 108. Moreover, the LIDAR sensors can be configured to track movement of identified users over time. The LIDAR sensors can be configured to identify and monitor movement of users without the use of machine-learning models. Similarly, the LIDAR sensors can identify and track movement of one or more soccer balls on the soccer field 108, similar tracking movement of one or more soccer by the depth-sensing cameras.

In some implementations, the display system 110 can include one or more RGB cameras that are configured to perform specific functions. In particular, the specific functions can include (i) recording image data of a field of view of the soccer field 108 and (ii) recording image data of an area underneath a top portion of the soccer goal 112 to detect when the soccer ball 106 passes through a vertical plane of the soccer goal 112, indicating a successful shot attempt. The vertical plane can represent a virtual plane from the top portion of the soccer goal straight down to the ground. If a sensor detects the soccer ball completely passing through the vertical plane, then the display system can deem the shot attempt as successful. For example, the soccer goal 112 may include a one dimensional LIDAR device on a bottom plane of the top bar of the soccer goal 112. The one-dimensional LIDAR is a laser light constantly refreshing, searching for the soccer ball to pass through the vertical plane of the soccer goal 112. The one-dimensional LIDAR would require a single LIDAR device emitter rotating and centered down. The LIDAR device emitter can rotate at 100 revolutions per second, for example. More specifically, the LIDAR device can continuously sweep the plane of the open goal edge and can detect when the vertical plane was intersected with the soccer ball.

For example, the display system 110 can include one or two RGB cameras. The RGB camera(s) can record, in real time, an area of the soccer field 108 within proximity to the display system 110. The area can include, for example, an area up to a half way line on the soccer field 108, a length of the full soccer field 108 if the field corresponds to a regulation soccer field, a gymnasium area, or some other area. Additionally, the RGB camera can record image data of an area below the top portion bar below the soccer goal 112, which may be used when a shot attempt is successful. The RGB camera can provide the recorded image data to the control unit for further analytics and usages, which will be further described below.

Referring to FIG. 1A, during stage (A), user 102 can request to interact with soccer system 107 by, for example, requesting to play a soccer game. In some implementations, user 102 can access a soccer application on their client device 104. The user 102 can log in to the soccer application using authentication credentials, e.g., username and password, and can gain access to the applications offered by the soccer system 107, such as games, training sessions, and the like. The user 102 can select to interact with the soccer system 107 using the soccer ball 106. For example, as illustrated in system 100, the user 102 can select a game to count the number of shots made in a predetermined amount of time.

In other implementations, the user 102 can communicate with the soccer system 107 to request to play a soccer game with the soccer system 107. The user 102 can provide a verbal command, e.g., "Hey Huupe," to the soccer system 107 or perform a hand wave to wake up the soccer system 107. The components within the display system 110, e.g., the microphone and/or the depth sensing cameras, can detect the user communicating with the soccer system 107 and perform functions to detect the user 102. For example, the microphone and the depth sensing cameras can provide the verbal command, e.g., "Hey Huupe," and the image data detecting the user 102, respectively, to the control unit. The control unit can determine from the audio data and the image data (i) an identification of the user 102 and (ii) an indication that the control unit is to provide the user 102 with access to a list of games to play.

The control unit can provide the list of games to play to the display screen of the display system 110 or to the user's device 104. Additionally, or alternatively, the control unit can provide the list of games to play in an auditory manner to the speakers of the display system 110. The user 102 can select which game to play by speaking to the soccer system 107 or making a selection via the user's client device 104. For example, the user 102 can indicate "Hey Huupe, play shot timer" and the control unit can recognize the voice command and determine the user 102 requests to play the shot timer game. Alternatively, the user 102 can select which game to play by waving their hand in front of the soccer system 107. The display of the system 110 can list the games to play and the user 102 can stick their arm up to act as a mouse on the display. The depth sensing cameras can recognize through recorded image data that the user 102 reached their arm up and provide the recorded image data to the control unit. The control unit can associate the arm up during this request that the user 102 wishes to select a game to play from the list of games. In a continuous fashion, the user 102 can move their arm, and the depth sensing camera, the control unit, and the display, can work together to exhibit a mouse moving in a fashion similar to the user 102's arm to enable selecting a game to play. The display can visually illustrate a movement of the mouse over the list of games to play that moves as the user 102's arm moves. Alternatively, the user 102 may use his/her leg to act as the mouse. In another example, each hand position of the user 102 can represent one area of the display screen. In this case, should a user 102 raise a hand straight upwards, the depth cameras, control unit, and display would associate this movement with highlighting a button on the center top of the display screen. Should the user 102 raise a right hand at a 45 degree angle, e.g., top right of the display screen, the depth cameras, control unit, and display screen would associate this movement with highlighting a button on the top right corner of the display screen. This process would be similar if the user places a right hand at a −45-degree angle from with their right hand, which would correspond to highlighting a button on the bottom right of the display screen. If the user raises their left hand at a 45-degree angle, this would correspond to highlighting a button on the top left of the display screen. If the user places their left hand at a −45 degree angle, this would correspond to highlighting a button on the bottom left of the display screen. This process is similar for other hand positions around the display. Additionally, when the user changes from an open hand to a closed hand, e.g., open palm to a fist, the control unit can recognize the user's desires to select or enter that selection. The selection can also be performed by way of a highlight of a predetermined amount of time, e.g., 3 seconds.

The user 102 can select a game to play based on the arm movements by performing a selection. The selection can be, for example, a finger point, a verbal command, or some other hand gesture that indicates the user selects a particular game. In the example of system 100, the user 102 can select the shot timer game, and in response, the control unit can initiate execution of the shot timer game. For example, the control unit can provide to the display of the system a shot timer 116 and a shot counter 114, in digital format. The control unit can indicate to the user 102 to start shooting the soccer ball 106 towards the soccer goal 112 as soon as the shot timer 116 begins to count down.

In some implementations, the control unit can adjust the shot counter 114 as the user 102 attempts shots. For example, the user 102 can perform a shot attempt corresponding to shooting a soccer ball 106 towards the soccer goal 112. The depth sensing cameras and the sensors can generate image data and sensor data, respectively, and provide the image data and the sensor data to the control unit, where the control unit can determine (i) whether the user attempted a shot and (ii) whether the shot attempt was successful or unsuccessful. Then, the control unit can update the shot counter 114 in a heads up display (HUD) on the display based on whether the user attempted the shot and whether the shot attempt was successful or unsuccessful. For example, if the user 102 misses the first five shots, the control unit can display "0/5" for the shot counter on the HUD of the display system.

Additionally, the control unit can display recorded footage from the RGB cameras included within the display system 100. For example, as user 102 shoots the soccer ball 106, the RGB cameras can record an area of the soccer field 108 and provide the recorded image data to the control unit. The control unit can receive the recorded image data and display the recorded image data in real time on the display of the display system 110 as the user 102 plays. In this manner, the user 102 can visually see themselves on the display system 110 as the user 102 plays the shot timer game. Moreover, the control unit can digitally overlay the shot timer 116 and the shot counter 114 over the recorded image data on the display of the display system 110. The recorded image data from the RGB camera can fill the entire display of the display system 110. The shot timer 116 can be positioned in the upper left corner of the display system 110 and the shot count can be positioned in the bottom right corner of the display, to name an example. Other positions are also possible.

During stage (B), the one or more sensors included in the display system 110 can acquire sensor data 118 corresponding to the user 102 on the soccer field 108. As previously mentioned, the sensor data 118 can include data from the trip sensors, accelerometers, LIDAR sensors, and the motion sensors. For a particular shot attempt shown in system 100, the user 102's shot attempt was successful. The trip sensors can indicate that user 102's shot attempt was successful, as the soccer ball 106 passed through a vertical plane of the soccer goal 112 and strikes the net of the soccer goal 112. For example, the display system 110 can include a laser trip sensor that looks downward from a top bar of the soccer goal 112. If the laser trip sensor is tripped, the control unit can determine that the soccer shot attempt was successful, because the soccer ball 106 passes through the vertical plane of the soccer goal 112. Alternatively, if the laser trip sensor is not tripped, then the control unit can determine that the soccer shot attempt was unsuccessful.

The accelerometers can indicate a small vibration pattern because the path of the soccer ball 106 through a vertical plane of the soccer goal 112 resulted in a strike of the net of the soccer goal 112 at a particular location, or a successful shot that did not hit a bar of the soccer goal 112. Alternatively, if the soccer ball 106 did hit a bar of the soccer goal 112 during the successful shot attempt, the accelerometers can record a particular vibration pattern to indicate where the soccer ball 106 first landed on a bar of the soccer goal 112 and subsequently a location where the soccer ball 106 struck the net. The LIDAR sensors can detect a shot attempt of user 102 and characteristics of the user 102's shot attempt, e.g., angle and height of the soccer ball 106 during the shot attempt. The motion sensors can detect user 102 on the soccer field 108. Additionally, the motion sensors can detect movement of the user 102 and movement of the soccer ball 106.

In some implementations, the display system 110 can acquire the sensor data 118 from the multiple sensors on a periodic basis. For example, the sensors can be configured to acquire sensor data 118 every 2 seconds, 5 seconds, or 10 seconds. In other examples, the sensors can be configured to acquire sensor data 118 based on the type of game being played by the user 102. For example, if the user 102 is playing the shot timer game, then the sensors can be configured to acquire sensor data 118 on a more frequent periodic basis to ensure all shot attempts, whether successful or unsuccessful, are accounted for. Moreover, the user 102 can adjust the sensitivity or frequency of the sensors acquisition through the client device 104 if the user 102 notices the soccer system 107 incorrectly counting shot attempts, and incorrectly counting makes and misses and vice versa, until the count is accurate. In another example, if the user 102 is playing a game where the user is required to shoot shots from set locations on the soccer field 108, then the sensors can be configured to acquire sensor data 118 on a less frequent basis because in between each shot, the user 102 has to retrieve the soccer ball 106 and move to different set locations to perform a soccer shot attempt. The overall complexity and processing performed by the sensors and the control unit can be reduced in a game in which a user's goal is to shoot less but more precisely.

During stage (C), the one or more cameras included in the display system 110 acquire image data 122 corresponding to the user 102 on the soccer field 108. As previously mentioned, the image data 122 can include image data from the depth sensing cameras and the RGB cameras. For example, the image data 122 can include images or videos from each of the cameras. For example, as illustrated in system 100, the user 102's shot attempt is about to be attempted. The depth sensing cameras can generate (i) detection data of the user 102 on the soccer field 108, (ii) movement data of the user 102, (iii) detection data of the soccer ball 106 kicked by the user 102, (iv) track movement data of the soccer ball 106, and (v) detection data of a body posture of the user 102.

As previously described, the depth sensing cameras can generate and track each of the different detection and movement data of the user 102 and the soccer ball 106. The depth sensing cameras can continuously record the image data 122 monitoring the user 102 on the soccer field 108 and generate this detection/movement data for each frame of the recorded image data 122. In some examples, the depth sensing cameras can provide this image data 122 and detection/movement in a real-time fashion to the control unit. Additionally, the RGB cameras can record the user 102 on the soccer field 108 and can provide the recorded image data 122 to the control unit. The control unit can receive the sensor data 118 and the image data 122 to generate characteristics of the user and the shot attempt.

During stage (D), the control unit can receive the image data 122 from the depth sensing and RGB cameras and provide the image data 122 to a trained machine-learning model. The control unit can train a machine-learning model to perform a variety of functions. The functions can include (i) classify or identify each user on the soccer field 108 as a unique and persistent user, (ii) identify a user's shot attempt, (iii) generate characteristics of the user on the soccer field 108, and (iv) generate characteristics of the shot attempt by the user.

For example, the trained machine-learning model can correspond to a convolutional neural network (CNN). The control unit can train the machine-learning model using different image data of successful shot attempts and unsuccessful shot attempts from various locations on different soccer fields. The control unit can also train the machine-learning model using different image data of professional soccer athletes' shot attempts to understand the ideal shot attempt for assisting other users that interact with the soccer system 107. The control unit can provide image data of these professional athletes dribbling a soccer ball, shooting the soccer ball from various locations on the soccer field, and moving while dribbling the soccer ball. In another example, the RGB and depth sensing cameras can be used to determine body posture of the user's shot attempt and the CNN can be trained on identified body posture in accordance with an ideal body posture, e.g., a professional athlete or other individual's ideal body posture during a shot attempt, or which body posture identification provides the best results.

In some implementations, the control unit can also train the machine-learning model to identify users that interact with the soccer system 107. For example, when a user, such as user 102, seeks to initially use the soccer system 107, the application on the client device 104 may request the user to enter their credentials and to take a picture or selfie of themselves. This will provide the control unit with an initial image to train the machine-learning model to detect user 102. Then, the control unit can instruct the user 102 to play with the soccer system 107 by taking shot attempts. The control unit can acquire image data 122 of the user 102 and train the machine-learning model using the newly acquired image data 122. The control unit can provide an indication on the display that the soccer system 107 is in learning mode to learn the user 102. Then, at a later point in time, and once the machine-learning model is sufficiently trained, the control unit can apply the trained machine-learning model to (i) identify user 102 as a unique user, (ii) identify a user's shot, (iii) generate characteristics of the user on the soccer field 108, and (iv) generate characteristics of the shot attempt by the user.

In some implementations, the trained machine-learning model can output the labeled data 126. The labeled data 126 can indicate on a frame of image data 122 an identification of the user 102 and a location of the user 102 relative to the display system 110. For example, the labeled data 126 can indicate that user 102 is "Bob" and an (X, Y, Z) coordinate indicating where user 102 is located on the soccer field 108 relative to the soccer system 107. The labeled data can also indicate an angle of the soccer ball 106's trajectory for a particular frame of image data and an indication of whether the soccer ball 106 passes through the vertical plane of the soccer goal 112 and strikes a net of the soccer goal 112, e.g., a successful shot attempts. For example, the angle of the soccer ball 106's trajectory can indicate that the soccer ball is at 30 degrees at a particular point in time relative to the soccer system 107. Additionally, the labeled data 126 can indicate that the soccer ball 106 did pass through the vertical plane of the soccer goal 112, e.g., was successful. In some examples, the labeled data 126 can include a statistic or percentage that indicates a likelihood that user 102 is "Bob," a likelihood where user 102 appears to be located on the soccer field 107, a likelihood of an angle of the soccer ball's trajectory, and a likelihood of whether the soccer ball successfully passes through the vertical plane of the soccer goal 112 and strikes the net of the soccer goal 112. These likelihoods can range from 0-100% or 0-1, for example.

If multiple users 102 are interacting with the soccer system 107, then the control unit can identify and track each of the users 102 simultaneously. For example, the control unit can receive sensor data from each of the sensors within the display system 110 that monitors characteristics of each of the different users. The control unit can also receive image data from each of the cameras within the display system 110 and provide that image data to the trained machine-learning model. In response, the machine-learning model can identify each of the users on the soccer field 108 and can track each of the users on the soccer field 108 and their corresponding movements with and/or without a soccer ball. The labeled data 126, output by the trained machine-learning model, can include a frame of image data with labels for each of the users in the frame and characteristics corresponding to each of the users, as described above. For example, the trained-machine learning model can track each of the users interacting with the soccer system 107 based on their jersey, jersey number, particular clothing types, and physical characteristics. In this case, the trained machine-learning model can also associate makes and misses of each shot attempt from each of the users on the soccer field 108.

In some implementations, the trained machine-learning model can also be used to generate real-time predictions of users' shots. For example, the trained machine-learning model can generate real-time predictions for each shot as the soccer ball travels towards the soccer goal 112. For example, based on prior sensor data, image data, and current input data from the sensors and cameras, the soccer system 107 may initially predict the probability of a made shot when the ball is ten feet from the soccer goal 112, e.g., 70.0% probability of the shot being successful. The trained machine-learning model may adjust the probability after the soccer ball 106 hits a bar of the soccer goal 112, e.g., 55.0% probability of a made shot. The trained machine-learning model can be continuously updated/re-trained with the predictions and the results of the shot attempts using the image data and the sensor data captured from the soccer system 107.

During stage (E), the control unit can analyze the received sensor data 118 to determine whether the shot attempt was successful or unsuccessful. For example, the control unit can first determine from the LIDAR sensors whether a shot attempt was detected. If the control unit determines from the LIDAR data that a shot attempt was detected, then the control unit can analyze the data from the trip sensors, which are located on the top bar portion of the soccer goal 112, to determine whether the soccer ball 106 passed through the vertical plane of the soccer goal 112 or did not. If the shot did not pass through the vertical plane of the soccer goal 112, then the control unit can analyze the data provided by the accelerometers to determine the location the soccer ball 106 hit relative to a top portion of the soccer goal 112 or a side portion of the soccer goal 112 based on a vibration pattern. If no vibration pattern was detected and an unsuccessful shot attempt was detected, then the control unit can determine the user missed the soccer goal 112 and the display system 110 during the unsuccessful shot attempt. In another example, if the control unit determines that the soccer ball 106 did not pass through the vertical plane of the soccer goal 112, and a vibration pattern was detected, then the control unit can determine a location of where the soccer ball 106 bounced off the soccer system, e.g., whether the soccer ball 106 bounced off a side bar of the soccer goal 112, a top bar of the soccer goal 112, a portion of the display system 110, or a combination of each. The control unit can analyze the sensor data provided by the motion sensors and the LIDAR sensors to determine a location of the shot attempt and a trajectory or arc of the shot attempt. If the control unit determines that the shot did pass through the vertical plane of the soccer goal 112, the control unit can determine the vibration pattern, e.g., of the net and/or the bar of the soccer goal 112, to indicate where and how the soccer ball 106 passed through the vertical plane of the soccer goal 112.

During stage (F), the control unit can perform analytics on the labeled data 126 provided by the trained machine-learning model 124 and data resulting from analytics of sensor data 118 during stage (E). Based on the labeled data 126 and the analytics performed on the sensor data 118, the control unit can generate output data 130. The output data 130 can include a location of user 132, an identification of user 134, an angle of ball trajectory 136, a shot attempt make/miss 138, and a recommendation 140 for improvement. The control unit can generate the output data and store the data in a digital data type, e.g., a struct, class, or other, for example. For example, as illustrated in system 100, the location of user 132 can indicate—"12.00, 1.01, 0.00" for X, Y, Z coordinates relative to the soccer system 107 and the soccer field 108 measured in feet. The identification of user 134 can correspond to a name or another identifier that identifies user 102, e.g., "John". The angle of ball trajectory 136 can correspond to an angle over the time of flight trajectory, e.g., 5 degrees at $t_9$, where time can be measured in seconds or milliseconds, for example. The shot attempt make/miss 138 can correspond to a "make," for example. In addition, the control unit can generate the recommendation 140 based on the analytics performed.

For example, the control unit can generate a recommendation to provide to the user 102 for improving the user's subsequent shot attempts based on the user 102's current shot attempt and previous shot attempts. The recommendations can correspond to improvements for (i) a body posture of the user, (ii) a kicking angle of the user, (iii) a release point of the soccer ball during the shot attempt, (iv) an ankle angle of the kicking foot and the non-kicking foot during the shot attempt, and (v) a trajectory of the soccer ball during the shot attempt. For example, the control unit can compare the body posture of the user 102 during the shot attempt to stored image data of body posture during shot attempts by professional athletes. The user 102 can indicate through the application of the client device 104 that they wish to shoot like a particular professional athlete. The control unit can display to the client device 104 and/or the display of the display system 110 a side-by-side image data of the user 102 kicking the soccer ball and image data of the professional athlete shooting the soccer ball. In this manner, the user can try to practice their shooting form to match the professional athlete's shooting form shown on the display. The control unit can determine a closeness of shooting forms by comparison and provide a percentage, for example, to the user to indicate how close their body posture is to the professional athlete's during the shot attempt. In this manner, the user 102 is able to improve their body posture during the shot attempt over time. Alternatively, the client device can record image data of the user 102 dribbling and/or kicking the soccer ball and provide that image data to the control unit for display.

The control unit can also analyze the foot angle of the user 102 or another limb of the user 102 during the shot attempt. The foot angle can be angled outward, angled inward, or some angle in between during the shot attempt, for example. The control unit can indicate to the user 102 to adjust their foot angle for subsequent shots to align better with a professional's foot angle. Alternatively, the control unit can indicate to the user 102 to adjust their foot angle to improve chances of subsequent shot attempts being successful. The indication can be displayed on the display of the display system 110 or on a client device 104 as image data, e.g., video, or another form. Similarly, the control unit can analyze the contact point of the soccer ball 106 with the user 102's foot during the user's shot attempt, a subsequent trajectory of the soccer ball 106 during the user's shot attempt and provide a recommendations to improve those based on another player's shot contact point and trajectory, to ultimately improve the chance a subsequent shot is successful.

In some implementations, the control unit can generate a profile for user 102. The profile can include an identification of user 102, e.g., user named John, the credentials of the user 102, one or more client devices associated with the user 102, e.g., client device 104, and characteristics of the user 102 during shot attempts. For example, the characteristics of the user 102 during shot attempts can include the classification of the user and the location of the user on the soccer field 108 relative to the soccer system 107 during the shot attempt. Additionally, the characteristics of the user 102 can include a wingspan, a height, hand size, leg length, foot size, and speed of that user. The characteristics can also include prior shot attempts of the user 102, such as characteristics of the soccer ball 106's travel during the shot attempt, e.g., height, angle, trajectory point, speed of the ball during the shot attempt, and contact point during the shot attempt, at different time instances. The control unit can also store in the profile whether the prior shot attempts resulted in a make or miss as well as if the shot was made, a type of shot, e.g., a make that bounced off a top or side bar of the soccer goal 112 or a make that solely struck the net of the soccer goal 112. The control unit can also store the sensor data 118, the image data 122, the labeled data 126, and the output data 130 with the profile.

In some implementations, the control unit can also store game performance or game data associated with the game played by the user 102 in the profile that corresponds to user 102. The type of games played can include, for example, training session modes, local head-to-head matchups, live stream mode, and worldwide competition mode. For example, the game performance can include that represents the game played, a date and time the game was played, a number of players in the game, an identification of each player playing the game, a final score of the game, makes and misses for each for each player during the game, locations on the soccer field of each of the makes and misses from each player, and a time at which each make and miss occurred for each player in both absolute time and in relative time (relative to the start of the game). The control unit can store the game data as a tuple, struct, class, or some other computer format. If multiple users are playing a single game, then the control unit can store game data for each of the users in their corresponding profile for that single game.

The control unit can store the profile on the external server for the user 102. The control unit can access and retrieve the profile for the user 102 when the profile is updated, based on newly received sensor and image data. For example, the control unit can identify a user profile based on facial recognition from the received image data, user 102's input of username and password, iris recognition from the received image data, a matching fingerprint, or some other suitable authentication or identification method. Once the control unit identifies a user profile corresponding to the user 102, the control unit can access the corresponding profile from the external server and update its contents. Once completed with updating the profile for user 102, the control unit can update the external server with the revised profile.

During stage (G), the control unit can provide the output data 130 for the user 102's review. The control unit can provide the output data 130 for the user 102's review in a variety of ways. In one way, the control unit can provide the output data 130 to the client device 104 for the user 102 to review. In this manner, the user 102 can view the output data 130 for the most recent shot attempt to analyze, for example, angle of ball trajectory 136, the recommendation 140, and the location of user 132. In some examples, the control unit can provide the output data 130 to the display of the display system 110 and the user can interact with the display system 110 via verbal or hand waving commands to view the output data 130. In this manner, the user 102 can seek to improve their soccer skillset for subsequent shot attempts based on the output data 130 characterized by the soccer system 107 for the most recent shot attempt.

In some implementations, the control unit can also provide the generated profile of the user to the client device 104 for the user 102's review. The user 102 can access the application on their client device 104 to view the profile generated for them by the control unit. In particular, the user 102 can view data from prior shot attempts to analyze how the user's shot attempts have progressed in the profile. For example, the user 102 can view the sensor data 118, the image data 122, the labeled data 126, and the output data 130 for each prior shot attempt on their client device 104. In some examples, the control unit can display the profile on the display of the display system 110 and the user can interact with the profile via verbal or hand waving commands.

In some implementations, the control unit can provide encouragement recommendations to the user 102 as the user 102 plays the game. For example, if the control unit notices the user 102 has a low shot make to shot attempt ratio, the control unit can provide an audible message 146 through the speakers of the display system 110. The audible message 146 can be heard by the user 102, e.g., saying "6 minutes to go! Keep shooting." In another example, if the control unit notices the user 102's shot attempt was successful, the control unit can provide another audible message 144 through the speakers of the display system 110 that recites "Great Shot!" The control unit can also provide other audible messages to the speakers of the display system 110 or to the client device 104. Each of these messages of encouragement can also be stored with the user 102's profile.

The user 102 can continue playing the shot timer game until the time exhibited on the shot timer 116 elapses. Afterwards, the user 102 can select another game to play with the soccer system 107, review analytics generated by the soccer system 107 on either the display of the display system 110 or the client device 104, or turn off the soccer system 107. In some examples, the user can turn the soccer system 107 via the application on the client device 104.

In some implementations, a miniature-sized display system can be provided in system 100. The miniature-sized display system can include similar components and functionality compared to those described with respect to display system 110 of system 100. The miniature-sized display system may be placed in various locations within a home, a corporate building, or other areas. For example, a user may be able to mount the miniature-sized display system on a wall in a home, hang the miniature-sized display system over a particular side of a door or a closet, or place the miniature-sized display system on a floor. The miniature-sized display system may include multiple anchor points on a rear side of the display system for being attached to various attachment points. These anchor points can be attached by, for example, rope, hooks, screws, fasteners, and other attachments. The miniature-sized display system may be connected to a miniature soccer goal. In other examples, a user may be able to mount the miniature-sized display system on a surface in a garage, basement, or other areas within a home or corporate property. These other areas can include, for example, bedrooms, basements, kitchens, office spaces, living rooms, and other places.

In some implementations, the miniature-sized display system can include fewer components than the display system 110 while maintaining similar functionality. The number of sensors within the miniature-sized display system may be reduced because the size of the miniature-sized display system can be substantially smaller than the display system 110. For example, the miniature-sized display system may include two depth-sensing cameras, instead of three to eight, with overlapping fields of view for viewing the area where a user is shooting a soccer ball. The soccer goal connected to the miniature sized display system may also be smaller than typical soccer goals.

The miniature-sized display system can include a similar number of games to play as the display system 110 and include an ability to connect with other miniature-sized display systems located in other geographic regions, over a network. In some cases, the miniature-sized display system can include an ability to play soccer games with users at other regular sized display systems, e.g., such as display system 110, in different geographic regions over a network. A user can interact with the miniature-sized display system by communicating with the miniature-sized display system verbally, by way of hand gestures, or by interacting with a smart application of their client device that communicates with the miniature-sized display system, similar to how a user would interact with display system 110.

Figure 1B:
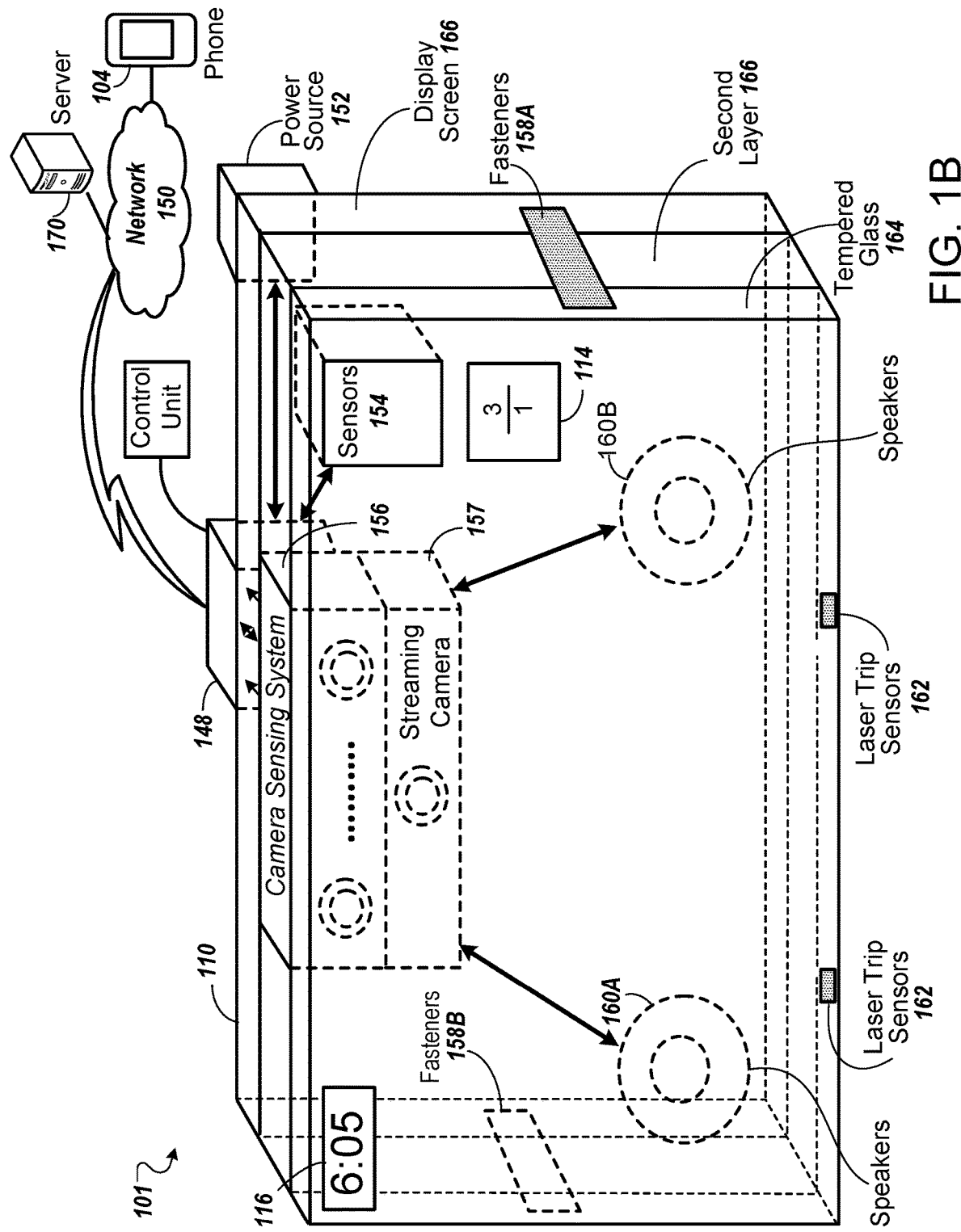
FIG. 1B is a block diagram that illustrates an example of a system of a display system.

FIG. 1B is a block diagram that illustrates an example of a system 101 of a display system. The system 101 illustrates, in detail, a structure of the display system 110. This display system 110 shown in system 101 is similar to the display system 110 illustrated in system 100.

The system 101 includes the display system 110, a network 150, a client device 104, and an external server 170. The display system 110 includes a front layer 164, a second layer 166, and a display screen 168. The front layer 164, the second layer 166, and the display screen 168 are positioned in a longitudinal, layered, or stacked manner, but could be arranged in any suitable configuration. The system 101 includes fasteners 158A and 158B that can hold together in position the various layers of the display system 110. In some cases, the number of layers of the display system 110 can be less than three layers, as will be further illustrated and described below. The display system 110 is IP67 waterproof regulated and can weigh near 300 pounds, for example.

In some implementations, the display system 110 includes two layers, e.g., a front layer 164 and the display screen 167. The different components of the display system 110 can be positioned and configured to operate in three layers and two layers. In this case, the front layer 164 and the display screen 168 can be spaced apart a predetermined amount to reduce the shocks during a user's shot attempt. For example, the front layer 164 and the display screen 168 can be spaced apart by 0.5-1.0 inches so that when the soccer ball strikes the front layer 164, the front layer 164 will not contact with the display screen 168 as the front layer 164 vibrates or flexes.

In another example, the display screen 168 tightly abuts the front layer 164. In this example, the front layer 164 is formed from a generally rigid plexiglass or other suitable material and there is minimal or no space between the front layer 164 and the display screen 168. As such, the front layer 164 does not move relative to the display screen 168 when the soccer ball contacts the front layer 164. Thus, the display screen 168 is not damaged when the soccer ball contacts the front layer 164. The display system can be connected to the soccer goal 112 which creates a stable system. The stable system is rigid such that the forces applied by the soccer ball to the front layer 164 are transmitted to the ground thereby minimizing vibrations and rattling of the display screen 168.

The fasteners 158A and 158B can be shock-absorbing fasteners that couple the different layers of the display system 110. The fasteners 158A and 158B can be any suitable devices that absorb and/or minimize transfer of shock forces and/or vibration from the top and side bars of the soccer goal 112 and/or the front layer 164 to the display screen 168. In one example, the fasteners 158A and 158B can include one or more brackets and a spring, screws, rivets, bolts, or other suitable mechanisms. In another example, the fasteners 158A and 158B can include one or more adhesives, sealants, or other suitable mechanisms.

In some implementations, the front layer 164 of the display system 110 can protect the components within the display system 110. For example, the front layer 164 can be tempered glass, covered with a protective coating with a translucent or transparent material, such as anti-reflective coating, or both. The front layer 164 can also be configured to enable a user, such as user 102, interacting with the display system 110 to view the display screen 168 in a third layer of the display system 110. The second layer 166 of the display system 110 can include a small region between the front layer 164 and the display screen 168 that includes the one or more components of the display system 110. The bottom portion of the display system 110 can connect to a top portion of the soccer goal 112.

For example, the second layer 166 can include the camera sensing system 156, the streaming camera 157, the sensors 154, and the speakers 160A and 160B. The camera sensing system 156 can include one or more depth sensing cameras that view the soccer field 108 and are positioned at a top portion and in the center of the second layer 166. The streaming camera 157 can include one or more RGB cameras that view the soccer field 108 and can be positioned below the camera sensing system 156. In some examples, the second layer 166 can be a compressible material such as rubber or foam padding.

The sensors 154 can be positioned in a variety of locations within the second layer. For example, the LIDAR can be positioned within the camera sensing system 156. The motion sensors can be positioned within the camera sensing system 156. The trip sensors 162 can be laser trip sensors that are positioned at the bottom of display system 110 on the front layer 164. The speakers 160A and 160B can be positioned within the second layer 166 of the display system 110. The speakers 160A are capable of playing music and/or providing audible feedback to the user 102. The accelerometers can be positioned within the sensors 154 of the second layer 166. The microphone(s) can be positioned within the sensors 154 of the second layer 166.

As previously mentioned, the sensors 154, including the trip sensors 162, can sense the player, the soccer ball, and/or forces applied to the soccer system 107. The sensors 154 generate data that is processed and analyzed by the control unit 148. Each of the sensors 154 can be configured in a particular manner to properly detect, acquire, and generate sensor data for the user playing soccer. The sensors 154 can be coupled to the front layer 164, the display screen 168, or the second layer 166. In some examples, the sensors 154 can also be remote or disconnected from the soccer system 107. For example, the sensors 154 can be coupled to existing field lighting systems and/or auxiliary support structures along the sides or ends of the soccer field 108.

The control unit 148 can be positioned behind the display screen 168 of the display system 110. Each of the sensors, cameras, speakers, and microphones can connect to the control unit 148 in a bi-directional manner. The control unit 148 can communicate with the external server 170 and the client device 104 over the network 150. The network 150 can be, for example, the Internet, Wi-Fi, Bluetooth, Ethernet, or some other form of wireless or wired connection.

The display screen 168 can display the shot timer 116 and the shot counter 114. The user 102 can see the shot timer 116 and the shot counter 114 through the front layer 164 and the second layer 166. The user 102 can also see image data displayed on the display screen 168 by the control unit, e.g., video footage of user 102 playing soccer in real time or video footage of another user playing soccer from another connected control unit. The control unit can overlay the shot timer 116 and the shot counter 114 digitally over video footage provided to the display screen 168. Moreover, the square of the display system 110 can be generated and displayed by the display screen 168.

The display screen 168 can visually display information, indicia, videos, and/or pictures. The display screen 168 can have a brightness of 1000 or more NITS. The display screen 168 can be any suitable display panel such as, for example, an LED or LCD display screen. For example, the display screen 168 can be a smart TV. The display screen 168 can also be a screen for projection of information, indicia, videos, and/or pictures. For example, a projector may project information to the display screen. In another example, the display screen 168 can include a short throw projector for providing information, indicia, videos, and/or pictures as the display. The client device can stream any image data to the display screen 168 for a user's view.

The system 101 also includes the power source 152. As previously mentioned, the power source 152 can power the one or more components within the second layer 166 of the display system 110, the display within the display system 110, and the control unit. The power source 152 can include, for example, a power plug that is inserted into an outlet, a solar energy panel coupled to the soccer system 107, or a rechargeable battery pack attached or coupled to the soccer system 107. The power source 152 can be located on a rear side of the display screen 168.

Figure 2A:
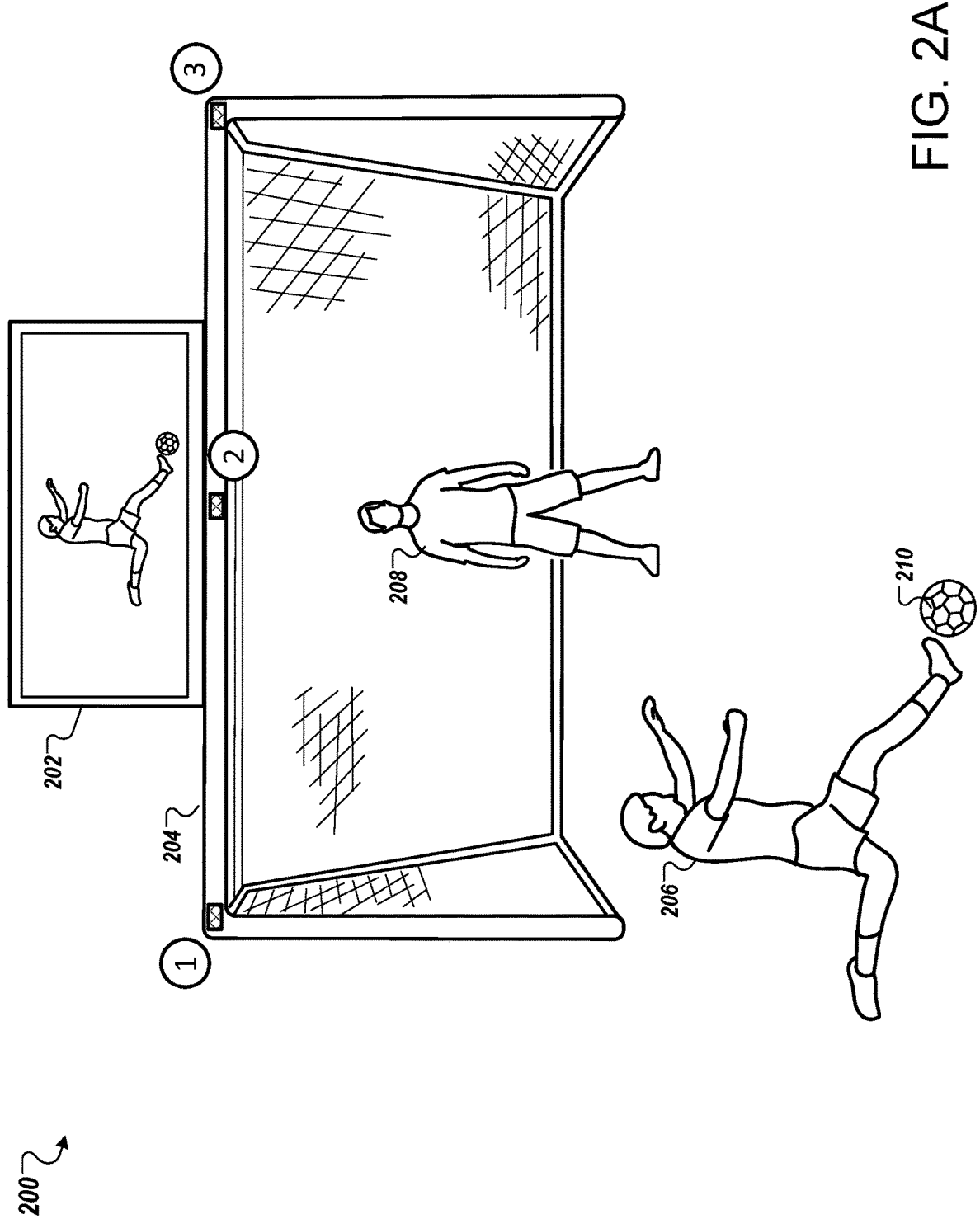
FIG. 2A is a block diagram that illustrates an example of a user interacting with a soccer system.

FIG. 2A is a block diagram that illustrates an example of a system 200 of a display system 202. In particular, the system 200 illustrates a user 206 shooting a soccer ball 210 at a soccer system. The soccer system includes a display system 202 and a soccer goal 204. The display system 202 and soccer goal 204 connect at a top portion of the soccer goal 204. In some implementations, the display system 202 may connect to a side portion of the soccer goal 204. In other implementations, the display system 202 may be separate from the soccer goal 204.

The soccer goal 204 includes three depth-sensing cameras—1, 2, and 3. The three depth sensing cameras 1, 2, and 3 are positioned in the top bar of the soccer goal 204, which ensures stability. The three depth sensing cameras may be positioned in any configuration around the bars of the soccer goal 204. By placing the three depth sensing cameras in the top bar of the soccer goal 204, the depth sensing cameras can cover a wide range area of the soccer field, collectively, e.g., for a full 180 degree coverage of the entire soccer field. In this case, the three depth sensing cameras can be configured and controlled by the display system 202, which requires electrical wiring through the soccer goal 204's posts. The three depth sensing cameras can be in addition to or replace the depth sensing cameras in the display system shown in the system 101. Specifically, the three depth sensing cameras may be wired through the soccer goal 204's posts to the display system 202.

Training from trainers all over the world can assist players with the display system 202 on how to juggle, how to kick, how to pass, etc. And gaming (synchronous and asynchronous) can be implemented to hit specific parts of the goal and have worldwide competitions with leaderboards on who the best strikers are. The cameras will track makes/misses, ball placement in the goal, velocity of ball, the amount of juggles a player can do, the amount of passing, how fast the players are, etc. Those stats can be monitored for performance data and gaming collectively to immerse the user in improving his/her soccer experience.

The user 206 may attempt to kick soccer ball 210 to score on soccer goal 204. In some cases, the display system 202 can monitor the user 206's kicking actions by way of the three depth sensing cameras in the soccer goal 204 and other devices within the display system 202. Additionally, the display system 202 can also effectively monitor the actions of user 206 with soccer ball 210 when a goalie 208 is placed in front of the soccer goal 204. In some implementations, the display system 202 and the depth sensing cameras 1, 2, and 3 may monitor and provide feedback on the actions taken by the goalie 208.

Figure 2B:
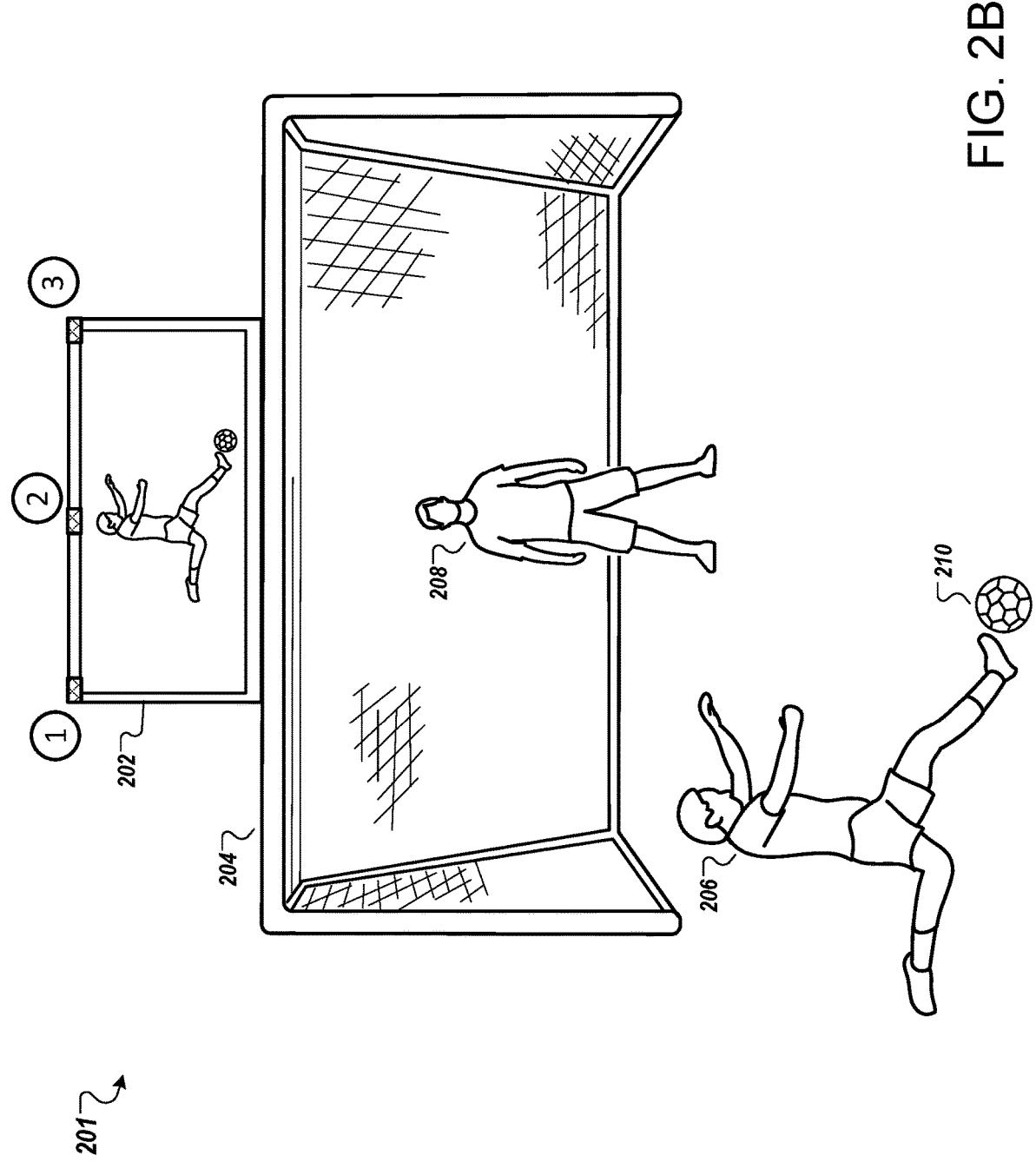
FIG. 2B is another block diagram that illustrates an example of a user interacting with a soccer system.

FIG. 2B is another block diagram that illustrates an example of a system 201 of a display system 202. System 201 is similar to system 200. However, in system 201, the depth sensing cameras 1, 2, and 3 are positioned within a portion of the display system 202. The positioning of the depth sensing cameras 1, 2, and 3 within the display system 202 is similar to how the depth sensing cameras are positioned as shown with respect to system 101.

Figure 2C:
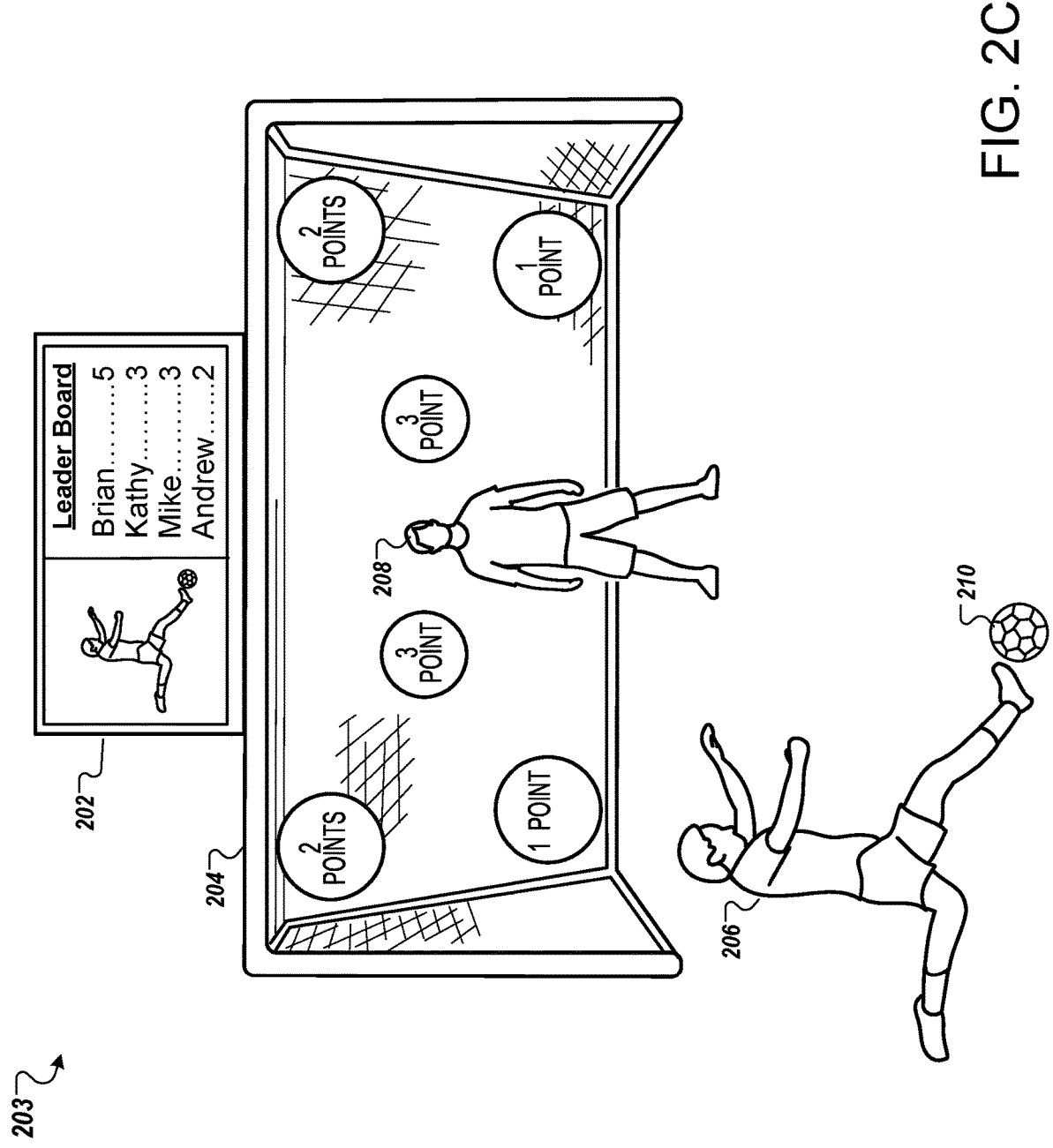
FIG. 2C is another block diagram that illustrates an example of a user interacting with and scoring components of a soccer system.

FIG. 2C is another block diagram that illustrates an example of a system 203 of a display system 202. System 203 is similar to systems 200 and 201. Additionally, system 203 illustrates a leaderboard shown on the display system 202 and a number of points for scoring in different locations within the soccer goal 204.

The leaderboard shown on the display 202 illustrates different users, e.g., Brian, Kathy, Mike, and Andrew, who have accumulated points for shooting the soccer ball at the soccer goal 204. For example, the soccer goal 204 can include different virtual regions for 1 point, 2 points, and 3 points shots. In this example, if the display system 204 determines user 206 hits the soccer ball 210 in the upper left hand corner of the soccer goal 204, then the display system 204 adds 2 points to user 206's total score. The display system 204 can use the various cameras and sensors to determine when the soccer ball 210 crosses the vertical plane of the soccer goal 204 to indicate a goal and a location of where the soccer ball 204 strikes the net of the soccer goal 204.

Figure 3:
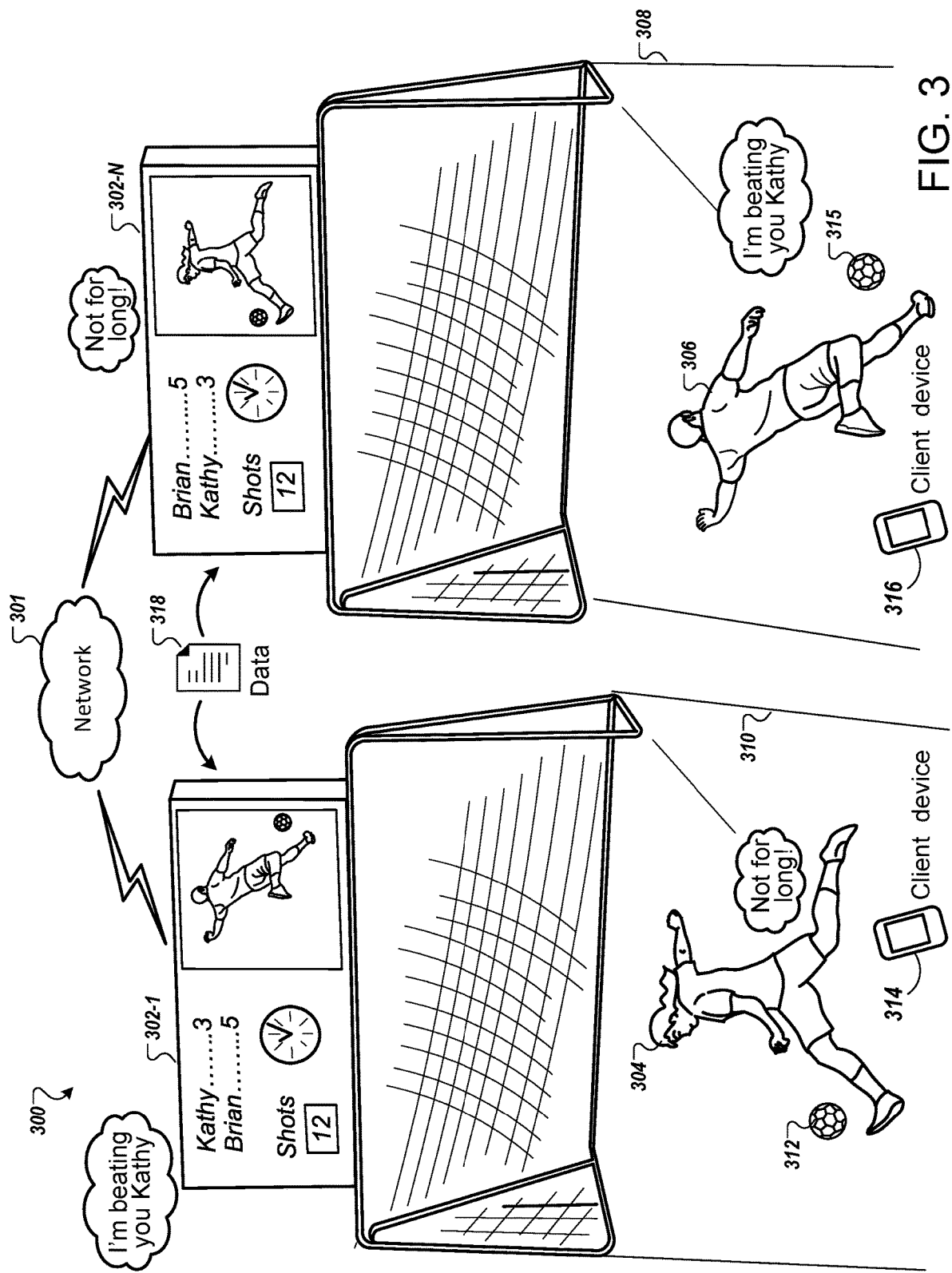
FIG. 3 is a block diagram that illustrates an example of a system of two users playing soccer with connected soccer systems.

FIG. 3 is a block diagram that illustrates an example of a system 300 of two users playing soccer with connected soccer systems. As previously mentioned, the soccer system, such as soccer system 107 of FIG. 1A, enables users to play various soccer games. The various soccer games can include, for example, training session mode, head-to-head matchup mode, worldwide competition mode, and live stream mode, to name a few. The system 300 illustrates an example of a head-to-head matchup mode between two different soccer systems.

System 300 illustrates a soccer system 302-1 and 302-N taking part in a head-to-head competition. The soccer system 302-1 and the soccer system 302-N communicate with one another via their respective control units over a network 301. The network 301 can be, for example, the Internet, Wi-Fi, or another form of wired or wireless connection.

At the soccer system 302-1, a user 304 can register with the soccer system 302-1 with their client device 314 to play a head-to-head game. The user 304 can play on the soccer field 310 using the soccer ball 312. Similarly, at the soccer system 302-N, another user 306 can register with the soccer system 302-N with their client device 316 to play a head-to-head game. The user 306 can play on the soccer field 308 using the soccer ball 315.

In some implementations, the user 304 can transmit a request to the soccer system 302-1 to play in the head-to-head competition. The user 304 can provide an indication or request through an application on the client device 314 to play in a head-to-head competition game to the soccer system 302-1. The indication or request can also indicate whether the user 304 desires to play against a friend or a random match. If the user 304 selects a friend, the soccer system 302-1 can send out a request to the soccer system associated with the friend, e.g., soccer system 302-N. Alternatively, if the user 304 selects a random match, then the soccer system 302-1 can retrieve each of the other soccer systems that are currently online and are currently listed in a queue, are also requesting to perform a head-to-head competition, and can randomly select one of those soccer systems in the queue to play against the user 304 from the soccer system 302-1. Alternatively, the soccer system 302-1 can select the top soccer system in the queue to play against the user 304.

Similarly, the user 306 can provide an indication or request through an application on the client device 316 to play in a head-to-head competition game on the soccer system 302-N. The soccer system 302-N can determine whether the user 306 requested a friend match or a random matchup. Based on the request, the soccer system 302-N can communicate out to another soccer system to setup the head-to-head competition over network 301. For example, the control unit of the soccer system 302-1 can transmit a request 318 to the control unit of the soccer system 302-N. The control unit of soccer system 302-N can setup the head-to-head competition in response to receiving the request 318 and responding to the request 318 with an acceptance.

The soccer system 302-1 and the soccer system 302-N can be located in different geographic regions. For example, the soccer system 302-1 can be located in a gymnasium in New York City, New York, and the soccer system 302-N can be located in a gymnasium in Geneva, Switzerland. In other examples, the soccer system 302-1 can be located at one house, and the soccer system 302-N can be located on a soccer field outside. In other examples, the soccer system 302-1 and the soccer system 302-N can be located at opposite ends of the same soccer field. As long as the soccer systems can connect to a network connection, e.g., the Internet, then the soccer systems can connect to one another. In other implementations, the soccer systems do not need an internet connection to communicate with one another. Rather, the soccer systems can communicate over a cellular connection that has a particular throughput and consistent network connectivity.

In response to the soccer systems 302-1 and 302-N accepting a head-to-head competition, a head-to-head module executes at both soccer systems. For example, the display system of soccer system 302-1 displays a recorded live video stream of user 306 playing soccer. Similarly, the display system of soccer system 302-N displays a recorded live video stream of user 304 playing soccer. One or more RGB cameras at the soccer system 302-1 records image data of the field 310 where user 304 plays, and provides the recorded image data to the control unit of soccer system 302-1. The control unit of the soccer system 302-1 transmits the recorded image data over network 301 to the control unit of soccer system 302-N, to be displayed on the display screen of the soccer system 302-N. Similarly, one or more RGB cameras at the soccer system 302-N records image data of the field 308 where user 306 plays, and provides the recorded image data to the control unit of soccer system 302-N. The control unit of the soccer system 302-N transmits the recorded image data over network 301 to the control unit of soccer system 302-1, to be displayed on the display screen of the soccer system 302-1. This process occurs simultaneously so user 304 can see user 306 playing on display system of soccer system 302-1 and so user 306 can see user 304 playing on display system of soccer system 302-N.

Additionally, both users can speak to one another during the head-to-head competition. For example, user 306 can say "I'm beating you Kathy!" The microphone of the soccer system 302-N can pick up the audible message, provide the audible message to the control unit, and the control unit can transmit the audible message to the control unit of the soccer system 302-1. There, the control unit of the soccer system 302-1 can play the audible message through the speakers of the soccer system 302-1, where user 304 can hear the message "I'm beating you Kathy!"

User 304 can respond by speaking a verbal message "Not for long!" The microphone of the soccer system 302-1 can pick up the verbal message and transmit the message to the control unit of the soccer system 302-1. The control unit of the soccer system 302-1 can then transmit the verbal message to the control unit of the soccer system 302-N, where the control unit of the soccer system 302-N receives the verbal message and provides the verbal message to be displayed by the speakers of the soccer system 302-N, e.g., speakers playing "Not for long!"

When the gameplay for the head-to-head competition begins, either with a "shot contest" or "most shots in under a predetermined time", soccer systems 302-1 and 302-N can initiate a countdown that is visually and/or audible played, e.g., "3, 2, 1, GO!" Both users 304 and 306 begin shooting their respective soccer balls 312 and 315 towards their soccer system 302-1 and soccer system 302-N, respectively. Both soccer systems 302-1 and 302-N can use their respective cameras and sensors to monitor each users' shots, shot attempts, using processes described above. The display screen of soccer system 302-1 can display both the ratio of shots made to shot attempts for user 304, e.g., 3/12, and the ratio of shots made to shot attempts for user 306, e.g., 5/12. Similarly, the display screen of soccer system 302-N can display similar ratios. The control unit of both can track the shots made and shot attempts and provide this information, along with the image data recorded by the RGB cameras, to the other control unit. In this manner, the control unit of soccer system 302-N can display the ratio of shots made to shot attempts for user 304 on the display screen of soccer system 302-N and the control unit of soccer system 302-1 can display the ratio of shots made to shot attempts for user 306 on the display screen of soccer system 302-1. Any update for shot attempts and shots made by both users is provided to both control units over the network 301 so their displays can update respectively.

The display screens of both soccer systems 302-1 and 302-N may display a timer if this is a timed competition. The timer between both display screens will be synced to ensure both users have the same amount of time for the head-to-head competition. Once the timer elapses, the winner with the highest ratio of shots made to shot attempts is deemed the winner of the competition.

Similar to stage (G) of system 100, the control unit for the soccer system 302-1 can provide output data for each attempted shot to the client device 314 for user 304's review. The control unit for the soccer system 302-N can provide output data for each attempted shot to the client device 316 for user 306's review. The control unit for the soccer system 302-N can also provide the output data to the control unit of soccer system 302-1 and/or client device 314 for user 304 to review their opponents results. The control unit for the soccer system 302-1 can also provide the output data to the control unit of soccer system 302-N and/or client device 316 for user 306 to review their opponents' results. Similarly, both control units can associate image data, sensor data, and the output data for each shot attempt with the profile of the respective users. For example, the control unit of soccer system 302-1 can store the image data, the sensor data, and the output data for each shot attempt by user 304 in their profile. The control unit of soccer system 302-N can do the same storage procedure for user 306 and associated profile.

A similar process can be performed as described above with respect to system 300, should user 306 and user 304 play soccer at the same soccer system, e.g., soccer system 302-1. In this case, the components of the soccer system 302-1 can monitor both the user 304 and corresponding soccer ball 312 and user 306 and corresponding soccer ball 315. The control unit of the soccer system 302-1 can display the ratio of shots made to shot attempts for both users as they perform shot attempts on the display screen of the soccer system 302-1. In this example, the display screen of the soccer system 302-1 can display a video recorded from the RGB camera of the soccer system 302-1 of both users playing on the soccer field 310 as they play. The ratio of shots made to shot attempts for both users can be overlaid on the display screen over the video recorded from the RGB camera. In this case, both users can see their respective scores, e.g., respective ratios, and the recorded video of both user's gameplay.

In some implementations, these game plays can rank users that interact with soccer systems around the world. For example, the outcome of the head-to-head competition can result in user 304 winning and user 306 losing. As such, user 304's rank will move upwards and user 306's rank will move downwards amongst a list of other users. Users can seek to play games against other users using this ranking of players by way of their respective client device or soccer systems.

In another gameplay mode, livestream video highlights or real time soccer can be streamed to a soccer system. For example, while user 304 performs various shot attempts with soccer ball 312, the soccer system 302-1 can display soccer highlights from collegiate or professional soccer games. These games can include MLS games, college games, and high school games.

In another gameplay mode, the soccer systems can enable worldwide competition mode. In worldwide competition mode, two soccer systems are connected and play a game similar to the head-to-head matchup mode. Additionally, the worldwide competition mode enables two users to wager money on the head-to-head matchup. The wagered money can be managed to a financial account of the winner and the money can be used to purchase additional paid-features of the system. The paid-features of the system can include paying for premium live-remote one on one training, paying for special celebrity group coaching events, and other exclusive events.

In another game play mode, the soccer systems can enable users to play in a training mode. The user, such as user 304, can select the training mode when the user seeks to improve his or her soccer skillset. For example, when the training mode starts, the user can select a series of inputs from either the user's client device or the display system of the soccer system. The series of inputs can include, for example, "work on shooting," "soccer ball dribbling," "foot speed," "catch and kick," among other practice modes. The user can select which input they wish to practice or multiple inputs to practice. Then, the user is instructed to start practicing based on instructions provided by the training module. The control unit of the soccer system 302-1 can sense shot parameters, e.g., shot attempts, shot makes, shot misses, dribbling, body posture, ball movement, and body movement to name a few examples, based on data provided by the sensors and cameras during the training module. In response, the control unit can generate output data, e.g., output data 130, for each attempted action, e.g., shot attempt, soccer ball dribbling, ball movement, and user movement, and can store the output data for each attempted action associated with the user's profile.

The training module can end when a particular event occurs for the training module, e.g., the user makes 30 shot attempts from different locations on the soccer field, or the user learns how to dribble the soccer ball from one corner of the soccer field to the other corner. In response to the training module ending, the control unit can provide the output data to a display screen of the soccer system and/or to the client device of the user. The output data can include workouts and other recommendations to help the user improve their soccer skillset. If the user comes back later to perform a similar training module, the control unit can determine whether the user has improved or declined ability from the prior training module or from prior training modules. The control unit can then indicate this information to the user via the client device or the display screen, e.g., displaying "You have improved your shot percentage by 20% in 5 minutes since the last training session."

Figure 4:
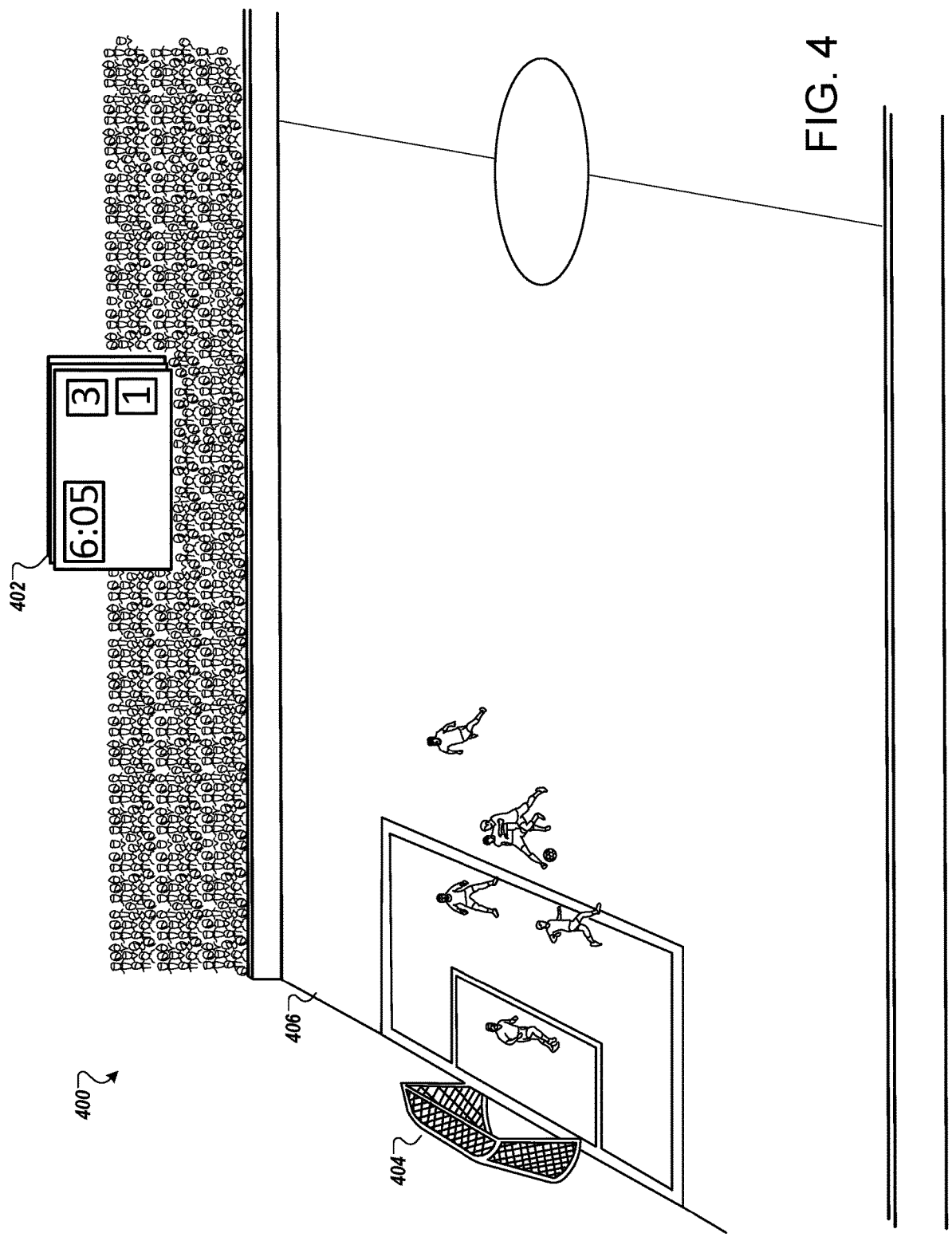
FIG. 4 is a block diagram that illustrates an example of a soccer system at a competitive match.

FIG. 4 is a block diagram that illustrates an example of a soccer system 400 at a competitive match. The soccer system 400 includes a soccer system 402, a soccer goal 404, and a soccer field 406. The soccer system 402, which is similar to the display system 202 and the display system 110, can monitor the actions of the players on the soccer field 406 with and without the soccer ball. Additionally, the soccer system 402 can associate the actions of the players with profiles and provide recommendations to each player to improve each player's gameplay after the competitive match has finished.

Figure 5:
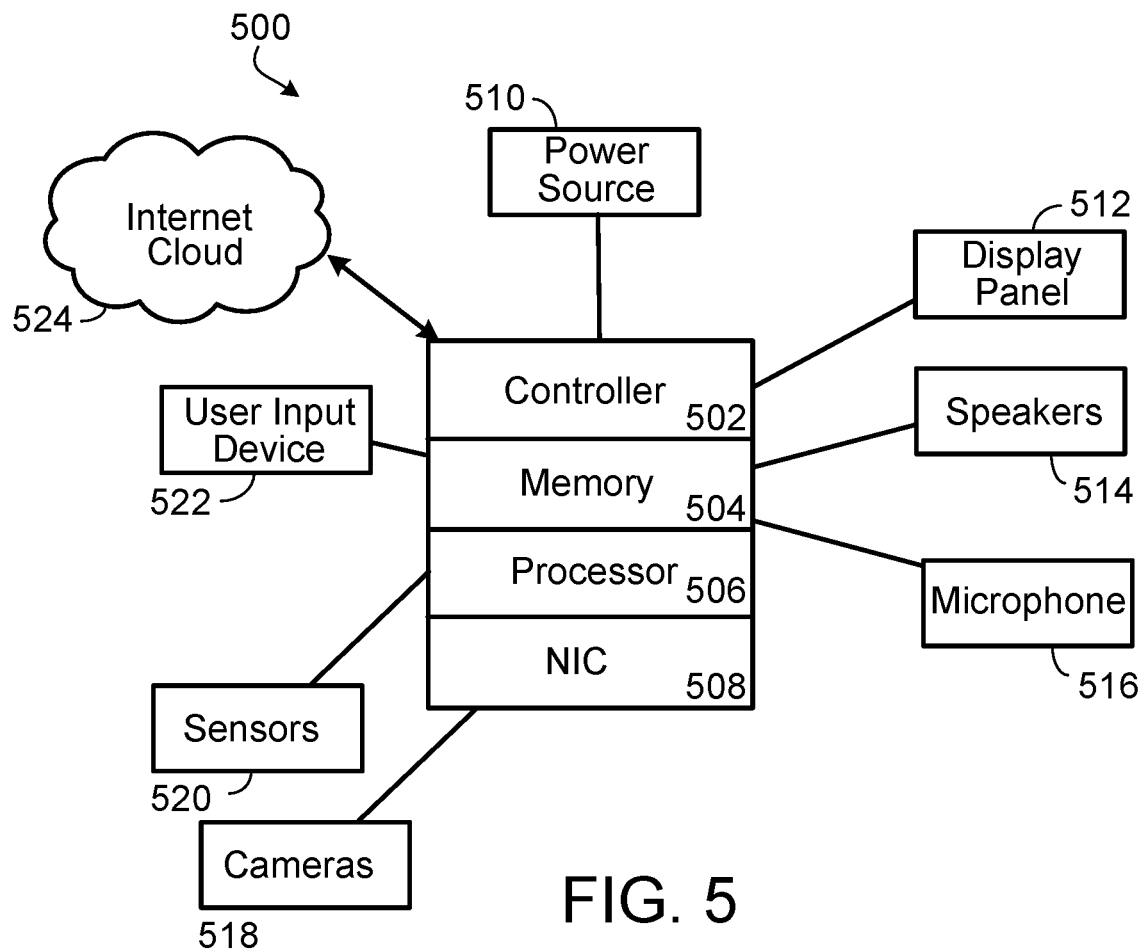
FIG. 5 is a block diagram that illustrates an example computing system of a display system.

FIG. 5 is a block diagram that illustrates an example computing system 500 of a display system. The computing system 500 can be illustrative of a display system 110, display system 202, soccer system 302-1, and soccer system 302-N. As previously mentioned, the soccer system includes a control unit 502 that receives the data from the sensors 520 and the cameras 518 and the control unit 502 can process and/or analyze the data from both sensors 520 and cameras 518. The control unit 502 includes a memory 504, a processor 506, and a Network Interface Card (NIC) 508, and is connected to other components of the computing system 500 via wired or wireless communication links.

The control unit 502 can receive data from other inputs such as a user input device 522. In one example, the user input device 522 is a personal smartphone or personal computer of the user. The user input device 522 can be connected to the control unit 502 via a wired connection through the NIC 508, e.g., the user input device 522 connected to the soccer system with a USB connector, an HDMI connector or a wireless connection. In one example, the wireless connection may be a Bluetooth connection between the user input device 522 and a transceiver connected to the soccer system and the control unit. In another example, the wireless connection may be a Wi-Fi network or cellular data network that connects to the internet or cloud 524. In this example, the internet 524 can provide wireless access/connection between the control unit 502 and the user input device 522, e.g., a personal smart phone. In certain examples, software stored on the memory analyzes the input data and generates output data that is communicated to the player via the user input device 522 and/or the display panel 512. The control unit 502 can also transmit data to and/or receive data from a software module or mobile application of the user input device 522. For instance, the mobile application of the user input device 522 can display data from the control unit 502 and/or provide entry fields for the user to input data which is sent to the control unit 502 via wired or wireless connection.

The power source 510 can power the components within the soccer system, as previously described. The control unit 502 can provide audible messages and music to the speakers 514. The control unit 502 can receive audible messages and sounds from the microphone 516.

As noted above, the control unit 502 analyzes the input data to generate output data. The processor 506 processes the input data and uses software programs or modules stored on the memory 504. Different modules can use the output data such that the user can use the soccer system in different ways. For example, the user can stream personalized training sessions, play head-to-head soccer competitions against other player in remote locations, e.g., other soccer field or local soccer fields. The output data can also be stored on the memory 504, the user input device 522, and/or a cloud storage system 524 such that performance and other metrics can be tracked over time as the user interacts with the soccer system. Accordingly, the user can access output data sets to understand how their soccer skill development and performance trends, e.g., number of missed shots, analyze or depict shot arcs relative to the soccer goal 112, and other characteristics. The control unit 502 can also display performance data of the user to the display panel 512.

FIG. 6 is a flow diagram that illustrates an example of a process 600 for generating characteristics of a user playing soccer. The process 600 can be performed by the display system 110, display system 202, display systems 302-1 and 302-N, and display system 402.

The display system can receive sensor data from a plurality of sensors and image data from one or more imaging devices regarding a shot attempt of a user, the plurality of sensors and the one or more imaging devices coupled to the display system (502). For example, a user can request to play a soccer game with the display system. The user can authenticate with their client device and/or display system using an authentication means, and can select a soccer game to play. For example, the soccer games can include a training session mode, local head-to-head matchups, live stream mode, and worldwide competition mode. Once the user has selected which soccer game to play via their client device or display system, a control unit of the display system can indicate to the user to start shooting a soccer ball towards a soccer goal coupled to or associated with the display system. This may occur when a shot timer begins to count down or some other indication to start the selected soccer game.

As user plays the game, e.g., moves with a soccer ball or performs a shot attempt by kicking the ball towards the goal, the cameras and the sensors can generate image data and sensor data, respectively, and provide the image data and the sensor data to the control unit, where the control unit can determine (i) whether the user attempted a shot and (ii) whether the shot attempt was successful or unsuccessful. Each of the sensors and cameras can be configured to perform different and/or similar functions. For example, the LIDAR sensors can be configured to detect the shot attempt of the user and one or both of an angle and a height of the soccer ball from the shot attempt. The motion sensors can be configured to detect one or more users on a field within a proximity to the display system. The trip sensors can be configured to determine the shot attempt was successful. The accelerometers can be configured to determine an indication of a location of the soccer ball relative to the display system based on accelerometer data and a vibration pattern during a shot attempt.

Moreover, the display system can include one or more cameras. The cameras can include one or more depth sensing cameras and/or one or more RGB cameras. Each of the cameras can be configured to perform different and/or similar functions. For example, the depth sensing cameras can be configured to perform one or more of the following: (i) detect the user on a soccer field, (ii) track movements of the user, (iii) detect the soccer ball used by the user for the shot attempt, (iv) track movements of the soccer ball, (v) detect a body posture of a user. The one or more RGB cameras can be configured to perform the following: record image data of a field of view of the field.

The display system can include multiple layers, each layer housing a different component. A front layer of the display system can include a transparent coating for protection of the components within the display system. For example, the front layer can include tempered glass that (i) protects the components within the display system 110 and (ii) allows a user to see a display screen behind the front layer. The display system can also include a second layer, seated behind the front layer. The second layer can include one or more components, e.g., sensors and cameras, for monitoring and generating data, e.g., sensor and image data, associated with user(s) on the field. The display system can also include a third layer that houses a display screen. In some implementations, the second layer of the display system can include the display screen for providing feedback to the one or more users playing soccer. The soccer goal can be coupled to the protective layer of the display system or the front layer of the display system.

The display system can also include a control unit, which houses the CPU and GPU for processing sensor and image data and providing output data to the display screen, one or more speakers, and/or a client device of the one or more users. The one or more speakers can provide audible output to the users corresponding to the output data.

The display system can determine whether the shot attempt was successful based on the received sensor data (504). In some implementations, the user's shot attempt with the soccer ball may result in an unsuccessful attempt. In the unsuccessful attempt, the soccer may bounce off a bar of the soccer goal or miss the soccer goal, display system, and any other components entirely. The display system may further include one or more trip sensors that are configured to determine whether the soccer passes through a vertical plane of the soccer goal from the shot attempt.

In other implementations, the user's shot attempt with the soccer ball may result in a successful attempt. In the successful attempt, the soccer may pass through the vertical plane of the soccer goal from the shot attempt. The user may score by passing the soccer ball through a vertical plane of the soccer goal, ricocheting the soccer ball off a bar of the soccer goal into the netting, or may pass through the soccer goal directly to the net without bouncing off the display system or bar of the soccer goal first.

The control unit of the display system can indicate to the sensors to acquire sensor data on a periodic basis. In other examples, the control unit of the display system can indicate to the sensor to acquire sensor data based on the type of soccer game being played. The control unit can also adjust the sensitivity of the sensors to improve detection of shot attempts, successful shot attempts, and unsuccessful shot attempts.

The display system can generate analytics that indicate (i) characteristics of the user, (ii) characteristics of the shot attempt, (iii) recommendations for improving the shot attempt for subsequent shot attempts based on the received image data and whether the shot attempt was successful, and (iv) game performance (506). The cameras within the display system can acquire image data from the depth sensing cameras and the RGB cameras. For example, the image data can include images or videos of the user(s) playing soccer on the soccer field. The depth sensing cameras, for example, can generate (i) detection data of the user(s) on the soccer field, (ii) movement data of the user, (iii) detection data of the soccer ball used by the user, (iv) track movement data of the soccer ball, and (v) detection data of a body posture of the user. The depth sensing cameras can generate and track each of the different detection and movement data of the user and the soccer ball continuously and over a period of time.

The control unit can receive the image data from the depth sensing and RGB cameras and provide the image data to a trained machine-learning model. The machine-learning model can generate data that (i) classify or identify each user on the field as a unique and persistent user, (ii) identify a user's shot, (iii) generate characteristics of the user on the soccer field, and (iv) generate characteristics of the shot attempt by the user. The trained machine-learning model can identify and track each of the users on the field simultaneously. The characteristics of the user can include an identification of the user and a location of the user on the field relative to the display system. The characteristics of the shot attempt can include an angle of the soccer ball's trajectory during a shot attempt and an indication of whether the soccer ball hits the net of the soccer goal. Moreover, the control unit can associate a user identified by the trained machine-learning model with a stored user profile.

Once identified, the control unit can update the stored user profile of the identified user with newly generated characteristics for that user including characteristics that describe the shot attempt of that user. More specifically, the control unit can determine resultant data based on the received sensor data that includes one or more of (i) whether the shot attempt resulted in the soccer ball passing through the vertical plane of the soccer goal, (ii) whether the shot attempt resulted in the soccer bouncing off a bar of the soccer goal and not scoring, (iii) a location of the shot attempt of the user, and (iv) an arc of the soccer ball during the shot attempt by the user. The control unit can store the resultant data with the characteristics of the user, the characteristics of the shot attempt output from the trained machine learning model, the received sensor data, and the received image data in the corresponding profile. The control unit can then provide the updated profile to the external server, where a plurality of profiles are stored, each profile corresponding to a different user.

In some implementations, the control unit can use the data generated from a trained machine-learning model and the received data to generate recommendations for the user. For example, the recommendations can include improvements for the user for subsequent shot attempts. The recommendations can focus one or more of (i) a body posture, (ii) a leg angle, (iii) a contact point of the soccer ball, and (iv) a trajectory of the soccer ball, during subsequent shot attempts for the user. The recommendations can also be stored with the profile for the specific identified user.

In some implementations, the control unit can store game data or game performance associated with the game played by the user in a profile of the user. The type of games played can include, for example, training session modes, local head-to-head matchups, live stream mode, and worldwide competition mode. For example, the game performance can include that represents the game played, a date and time the game was played, a number of players in the game, an identification of each player playing the game, a final score of the game, makes and misses for each for each player during the game, locations on the soccer field of each of the makes and misses from each player, and a time at which each make and miss occurred for each player in both absolute time and in relative time (relative to the start of the game). The control unit can store the game data as a tuple, struct, class, or some other computer format. If multiple users are playing a single game, then the control unit can store game data for each of the users in their corresponding profile for that single game.

The display system can provide output data representing the analytics to one or more of (i) the speaker, (ii) the display screen, and (iii) a client device of the user (608). For example, the control unit of the display system can provide the output data that includes the generated recommendations to the display screen of the display system. The output data can also correspond to an audible voice output, which can be provided to a speaker of the display system to communicate the generated recommendations to the user. In another example, the control unit can provide the generated recommendations to the client device of the user over a network. The control unit can also provide media from the RGB cameras to the display screen of the display system. In other examples, the control unit can receive media from another control unit associated with another display system and display the received media from the other control unit on the display system, such as during specific game types.

In some examples, the user can review their profile that includes the generated recommendations and the determined analytics. The user can review their corresponding profile on their client device and/or on the display screen of the display system. The control unit can receive an indication from the user to access the corresponding profile and the control unit can identify the corresponding profile of the user on the user. The control unit can determine which user profile to access based on authentication and identification of the user. Then, the control unit can provide the corresponding profile and its contents to the client device of the user and/or to the display screen of the display system. The user can review analytics on previous shot attempts, such as recorded footage, recommendations, comparisons between their shot attempt and professional athlete shot attempts, data associated with soccer games played by the user, e.g., a type of game played, shot attempts, makes/misses, and opponent shot attempts, makes/misses, time stamped information, and other soccer information associated with the user interacting with the soccer system.

In general, the terms device, system, computing entity, entity, and/or similar words used herein interchangeably may refer to, for example, one or more computers, computing entities, desktops, mobile phones, tablets, phablets, notebooks, laptops, distributed systems, gaming consoles, e.g., Xbox, PlayStation, Wii, watches, glasses, key fobs, radio frequency identification (RFID) tags, ear pieces, scanners, cameras, wristbands, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, retrieving, operating on, processing, displaying, storing, determining, creating, generating, monitoring, evaluating, comparing, and/or similar terms used herein interchangeably. In various embodiments, these functions, operations, and/or processes can be performed on data, content, information, and/or similar terms used herein interchangeably. Furthermore, in embodiments of the present invention, client device 104 may be a mobile device, and may be operated by a user participating in an interactive physical game.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. For example, while a client application is described as accessing the delegate(s), in other implementations the delegate(s) may be employed by other applications implemented by one or more processors, such as an application executing on one or more servers. In addition, the logic flows depicted in the figures do not require the particular order shown, or sequential order, to achieve desirable results. In addition, other actions may be provided, or actions may be eliminated, from the described flows, and other components may be added to, or removed from, the described systems. Accordingly, other implementations are within the scope of the following claims.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A soccer system comprising:
    a display screen configured to display user image data of one or more users;
    a plurality of sensors configured to generate sensor data regarding a shot attempt of a user;
    one or more imaging devices configured to generate image data of the shot attempt;
    a speaker;
    a control unit, wherein the control unit is configured to:
        receive (i) the sensor data from one or more of the plurality of sensors and (ii) the image data from the one or more imaging devices;
        based on the received sensor data, determine whether the shot attempt was successful;
        based on the received image data and whether the shot attempt was successful, generate analytics that indicate (i) characteristics of the user, (ii) characteristics of the shot attempt, (iii) recommendations for improving the shot attempt for subsequent shot attempts, and (iv) game performance; and
        provide output data representing the analytics to one or more of (i) the speaker, (ii) the display screen, and (iii) a client device of the user;
    a network interface coupled to the control unit, the network interface configured to connect the soccer system to one or more additional soccer systems, transmit user image data captured from the soccer system to the one or more additional soccer systems, receive user image data captured from the one or more additional soccer systems, and provide the received user image data to the control unit for display on the display screen.

2. The soccer system of claim 1, wherein the plurality of sensors comprise one or more of LIDAR sensors, motion sensors, trip sensors, and accelerometers, and wherein
    the LIDAR sensors are configured to generate sensor data indicative of the shot attempt of the user and one or more of an angle, a height, and a path of a soccer ball from the shot attempt;
    the motion sensors are configured to generate sensor data indicative of one or more users on a field within proximity to a soccer goal;
    the trip sensors are configured to generate sensor data indicative of whether the shot attempt was successful;
    the accelerometers are configured to generate sensor data indicative of an indication of a location of the soccer ball relative to the soccer goal based on accelerometer data and a vibration pattern; and
    wherein the control unit is configured to (i) detect the shot attempt of the user and one or more of the angle, the height and the path of the soccer ball from the shot attempt using the sensor data from the LIDAR sensors; (ii) detect the one or more users on the field within the proximity to the soccer goal using the sensor data from the motion sensors; (iii) determine whether the shot attempt was successful using the sensor data from the trip sensors; and (iv) determine the location of the soccer ball relative to the soccer goal based on accelerometer data and the vibration pattern using the sensor data from the accelerometers.

3. The soccer system of claim 1, wherein the one or more imaging devices comprise one or more depth sensing cameras or one or more RGB cameras, wherein the one or more depth sensing cameras are configured to perform one or more of the following (i) detect the user on a field, (ii) track movements of the user, (iii) detect the soccer ball used by the user for the shot attempt, (iv) track movements of the soccer ball, (v) detect a body posture of a user, and (vi) record a field of view for a soccer field given that one or more of the RGB cameras are configured to record video images.

4. The soccer system of claim 1, further comprising a soccer goal.

5. The soccer system of claim 4, wherein the plurality of sensors comprise trip sensors configured to generate sensor data indicative of whether a soccer ball passes through a plane of the soccer goal from the shot attempt; and
    wherein the control unit is configured to determine whether the soccer ball passes through the plane of the soccer goal from the shot attempt using the sensor data from the trip sensors.

6. The soccer system of claim 4, wherein the plurality of sensors comprise a two dimensional-LIDAR sensor configured to generate sensor data indicative of whether a soccer ball passes through a plane of the soccer goal from the shot attempt.

7. The soccer system of claim 1, wherein the speaker is configured to provide audible output in response to receiving the output data representing the analytics from the control unit.

8. The soccer system of claim 1, wherein the display screen is configured to display one or more of (i) the image data from the one or more imaging devices, (ii) a heads up display (HUD) displaying shot attempts and shots made by the user, (iii) the received user image data from a second control unit connected over a network, and (iv) image data from a client device.

9. The soccer system of claim 1, further comprising a protective layer coupled to the display screen.

10. The soccer system of claim 9, wherein the protective layer comprises tempered glass.

11. The soccer system of claim 9, further comprising a soccer goal coupled to the protective layer.

12. A computer-implemented method comprising:
    receiving sensor data from a plurality of sensors and image data from one or more imaging devices regarding a shot attempt, the plurality of sensors and the one or more imaging devices coupled to a soccer system;
    based on the received sensor data, determining whether the shot attempt was successful;
    based on the received image data and whether the shot attempt was successful, generating analytics that indicate (i) characteristics of the user, (ii) characteristics of the shot attempt, (iii) recommendations for improving the shot attempt for subsequent shot attempts, and (iv) game performance;
    providing output data representing the analytics to one or more of (i) a speaker, (ii) the display screen, and (iii) a client device of the user;

connecting the soccer system to one or more additional soccer systems;

transmitting user image data captured from the soccer system to the one or more additional soccer systems;

receiving user image data captured from the one or more additional soccer systems; and providing the received user image data to a control unit for display on the display screen.

13. The computer-implemented method of claim 12, further comprising:

detecting the shot attempt of the user and one or more of an angle, a height, and a path of a soccer ball from the shot attempt using the received sensor data from LIDAR sensors;

detecting one or more users on a field within proximity to a soccer goal using the received sensor data from motion sensors;

determining whether the shot attempt was successful using the received sensor data from trip sensors; and determining an indication of a location of the soccer ball relative to the soccer goal based on accelerometer data and a vibration pattern using the received sensor data from accelerometers.

14. The computer-implemented method of claim 12, wherein the one or more imaging devices comprise one or more depth sensing cameras or one or more RGB cameras, and the computer-implemented method further comprises one or more of the following:

detecting the user on a field;

tracking movements of the user;

detecting the soccer ball used by the user for the shot attempt;

tracking movements of the soccer ball;

detecting a body posture of a user; and recording a field of view for a soccer field given that one or more of the RGB cameras are configured to record video images.

15. The computer-implemented method of claim 12, wherein the soccer system comprises a soccer goal.

16. The computer-implemented method of claim 15, further comprising:

determining whether the soccer ball passes through a plane of the soccer goal from the shot attempt using the received sensor data from trip sensors, wherein the received sensor data from the trip data is indicative of whether a soccer ball passes through the plane of the soccer goal from the shot attempt.

17. The computer-implemented method of claim 15, wherein the plurality of sensors comprise a two-dimensional LIDAR sensor configured to determine whether a soccer ball passes through a plane of the soccer goal from the shot attempt.

18. The computer-implemented method of claim 12, further comprising:

providing audible output in response to receiving the output data representing the analytics from the control unit.

19. The computer-implemented method of claim 12, further comprising:

displaying one or more of (i) the image data from the one or more imaging devices, (ii) a heads-up display (HUD) displaying shot attempts and shots made by the user, (iii) the received user image data from a second control unit connected over a network, and (iv) image data from a client device.

20. A non-transitory computer-readable medium storing software comprising instructions executable by one or more computers which, upon such execution, cause the one or more computers to perform operations comprising:

receiving sensor data from a plurality of sensors and image data from one or more imaging devices regarding a shot attempt, the plurality of sensors and the one or more imaging devices coupled to a soccer system;

based on the received sensor data, determining whether the shot attempt was successful;

based on the received image data and whether the shot attempt was successful, generating analytics that indicate (i) characteristics of the user, (ii) characteristics of the shot attempt, (iii) recommendations for improving the shot attempt for subsequent shot attempts, and (iv) game performance;

providing output data representing the analytics to one or more of (i) a speaker, (ii) the display screen, and (iii) a client device of the user;

connecting the soccer system to one or more additional soccer systems;

transmitting user image data captured from the soccer system to the one or more additional soccer systems;

receiving user image data captured from the one or more additional soccer systems; and providing the received user image data to a control unit for display on the display screen.

* * * * *